(12) United States Patent
Wu et al.

(10) Patent No.: US 12,245,234 B2
(45) Date of Patent: Mar. 4, 2025

(54) ON DEMAND ASSISTANCE FOR SIDELINK MODE 1 COMMUNICATION

(71) Applicant: QUALCOMM Incorporated, San Diego, CA (US)

(72) Inventors: Shuanshuan Wu, San Diego, CA (US); Kapil Gulati, Belle Mead, NJ (US); Junyi Li, Fairless Hills, PA (US); Sourjya Dutta, San Diego, CA (US); Anantharaman Balasubramanian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 17/391,952

(22) Filed: Aug. 2, 2021

(65) Prior Publication Data

US 2023/0037156 A1 Feb. 2, 2023

(51) Int. Cl.
*H04W 72/20* (2023.01)
*H04W 72/23* (2023.01)

(52) U.S. Cl.
CPC ........... *H04W 72/20* (2023.01); *H04W 72/23* (2023.01)

(58) Field of Classification Search
None
See application file for complete search history.

(56) References Cited

U.S. PATENT DOCUMENTS

| | | | |
|---|---|---|---|
| 9,432,991 B2 * | 8/2016 | Khandekar | H04B 7/0632 |
| 2010/0120442 A1 * | 5/2010 | Zhuang | H04B 7/15507 |
| | | | 455/450 |
| 2016/0286471 A1 * | 9/2016 | Zisimopoulos | H04L 12/185 |
| 2016/0345371 A1 * | 11/2016 | Gattami | H04W 24/10 |
| 2017/0142653 A1 * | 5/2017 | Qi | H04B 7/2606 |
| 2018/0084481 A1 * | 3/2018 | Wang | H04W 40/246 |
| 2018/0242393 A1 * | 8/2018 | Wei | H04W 76/14 |
| 2018/0249461 A1 * | 8/2018 | Miao | H04W 72/27 |
| 2018/0324891 A1 * | 11/2018 | Wakabayashi | H04W 76/28 |
| 2019/0045569 A1 * | 2/2019 | Abedini | H04W 76/15 |
| 2020/0154501 A1 * | 5/2020 | Cheng | H04W 4/70 |
| 2021/0037532 A1 * | 2/2021 | Nam | H04L 25/0226 |
| 2021/0058992 A1 * | 2/2021 | Szilágyi | H04W 4/06 |
| 2021/0360415 A1 * | 11/2021 | Lekutai | H04W 76/15 |

(Continued)

OTHER PUBLICATIONS

Wymeersch et al., Radio Localization and Mapping with Reconfigurable Intelligent Surfaces, Dec. 2020, IEEE Vehicular Technology Magazine, pp. 52-61. (Year: 2020).*

*Primary Examiner* — Nicholas Sloms
(74) *Attorney, Agent, or Firm* — Procopio, Cory, Hargreaves & Savitch LLP

(57) ABSTRACT

Method and apparatus for on demand assistance for sidelink communication. The apparatus receives, from a base station, an AN configuration for one or more ANs associated with the base station. The apparatus transmits, to the base station, an AR to request assistance with communication with a second UE from at least one AN associated with the base station. The apparatus receives, from the base station, a grant to schedule sidelink transmission with the second UE. The sidelink transmission with the second UE is assisted by at least one AN of the one or more ANs associated with the base station. The apparatus communicates via sidelink communication with the second UE, via the at least one AN, using allocated resources of the grant from the base station.

28 Claims, 15 Drawing Sheets

(56) References Cited

U.S. PATENT DOCUMENTS

| | | | | |
|---|---|---|---|---|
| 2022/0014935 A1* | 1/2022 | Haija | ................... | H04L 5/0048 |
| 2022/0240260 A1* | 7/2022 | Zhou | ................... | H04W 72/02 |
| 2022/0303866 A1* | 9/2022 | Zhang | .................. | H04W 40/22 |
| 2022/0346162 A1* | 10/2022 | Van Phan | ............. | H04W 8/005 |
| 2022/0400462 A1* | 12/2022 | Dai | ............. | G01S 13/003 |
| 2022/0408415 A1* | 12/2022 | Ji | .......................... | H04W 72/40 |
| 2023/0026316 A1* | 1/2023 | Chen | .................... | H04W 76/14 |
| 2023/0028393 A1* | 1/2023 | Lee | .................... | H04W 64/003 |
| 2023/0032511 A1* | 2/2023 | Horn | ................. | H04B 7/15528 |
| 2023/0048554 A1* | 2/2023 | Hu | ....................... | H04W 76/19 |

* cited by examiner

ON DEMAND ASSISTANCE FOR SIDELINK MODE 1 COMMUNICATION

TECHNICAL FIELD

The present disclosure relates generally to communication systems, and more particularly, to a configuration for on demand assistance for sidelink communication.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a device at a UE. The device may be a processor and/or a modem at a UE or the UE itself. The apparatus receives, from a base station, an assisting node (AN) configuration of one or more ANs associated with the base station. The apparatus transmits, to the base station, an assistance request (AR) to request assistance with communication with a second UE from at least one AN associated with the base station. The apparatus receives, from the base station, a grant to schedule sidelink transmission with the second UE, wherein the sidelink transmission with the second UE is assisted by at least one AN of the one or more ANs associated with the base station. The apparatus communicates via sidelink communication with the second UE, via the at least one AN, using allocated resources of the grant from the base station.

In an aspect of the disclosure, a method, a computer-readable medium, and an apparatus are provided. The apparatus may be a device at a base station. The device may be a processor and/or a modem at a base station or the base station itself. The apparatus transmits, to at least a first user equipment (UE), an assisting node (AN) configuration of one or more ANs associated with the base station. The apparatus receives, from the first UE, an assistance request (AR) to request assistance with communication with a second UE from at least one AN associated with the base station. The apparatus transmits, to the first UE, a grant to schedule sidelink transmission between the first UE and the second UE, wherein the sidelink transmission between the first UE and the second UE is assisted by at least one AN of the one or more ANs associated with the base station.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
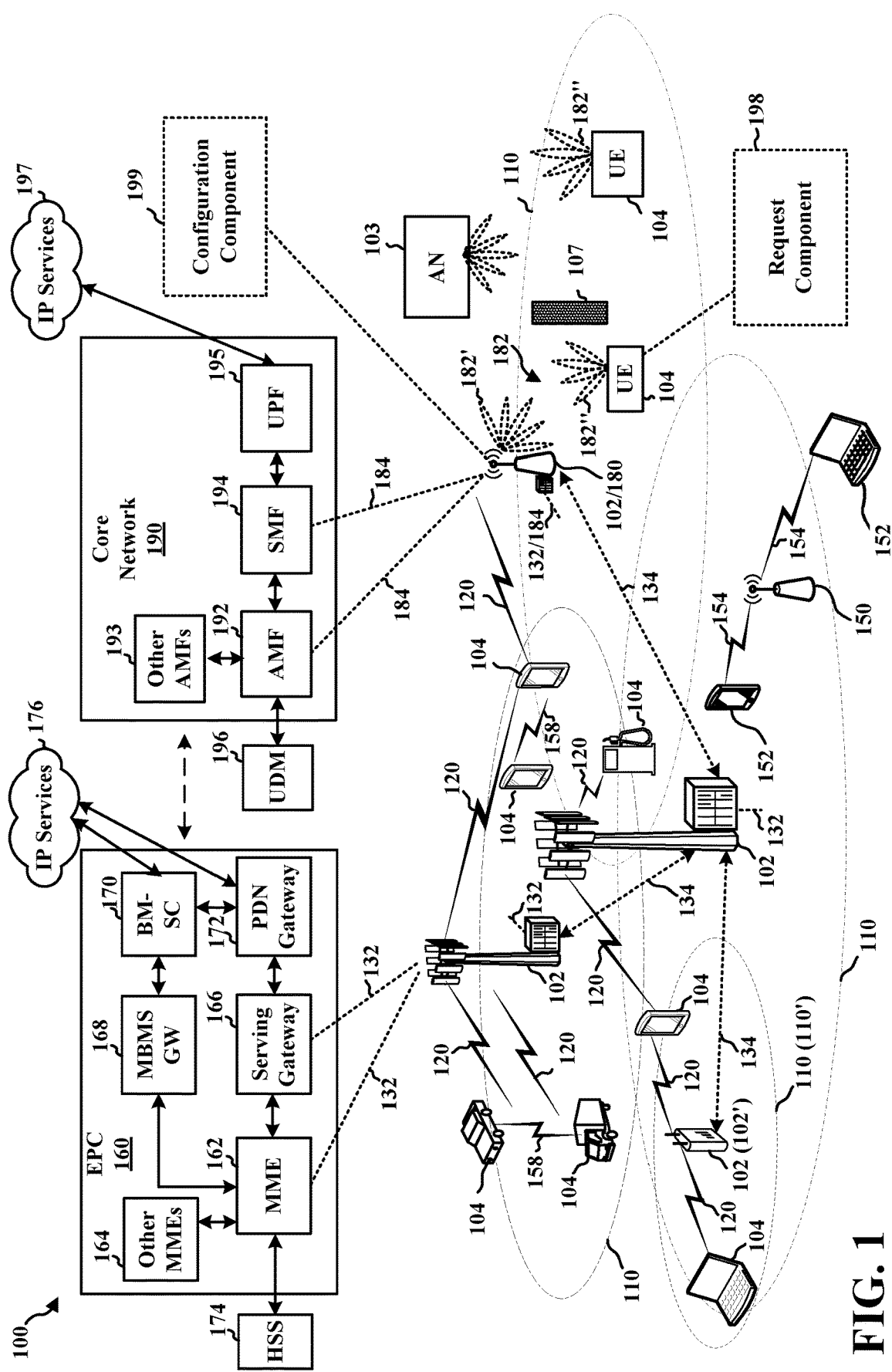
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may be configured to request assistance with sidelink communication with at least another UE. For example, the UE 104 may comprise a request component 198 configured to request assistance with sidelink communication with at least another UE. The UE 104 may receive, from a base station 180, an AN configuration for one or more ANs 103 associated with the base station. The UE 104 may transmit, to the base station 180, an AR to request assistance with communication with a second UE from at least one AN 103 associated with the base station 180. The UE 104 may receive, from the base station 180, a grant to schedule sidelink transmission with the second UE. The sidelink transmission with the second UE is assisted by at least one AN 103 of the one or more ANs associated with the base station 180. The UE 104 may communicate with the second UE, via the at least one AN 103, using allocated resources of the grant from the base station 180.

Referring again to FIG. 1, in certain aspects, the base station 180 may be configured to configure a UE to request assistance with sidelink communication with at least another UE. For example, the base station 180 may comprise a configuration component 199 configured to configure a UE 104 to request assistance with sidelink communication with at least another UE. The base station 180 may transmit, to at least a first UE 104, an AN configuration for one or more ANs 103 associated with the base station 180. The base station 180 may receive, from the first UE 104, an AR to request assistance with communication with a second UE from at least one AN 103 associated with the base station 180. The base station 180 may transmit, to the first UE 104, a grant to schedule sidelink transmission between the first UE and the second UE. The sidelink transmission between the first UE and the second UE is assisted by at least one AN 103 of the one or more ANs associated with the base station 180.

Although the following description may be focused on 5G NR, the concepts described herein may be applicable to other similar areas, such as LTE, LTE-A, CDMA, GSM, and other wireless technologies.

Figure 2:
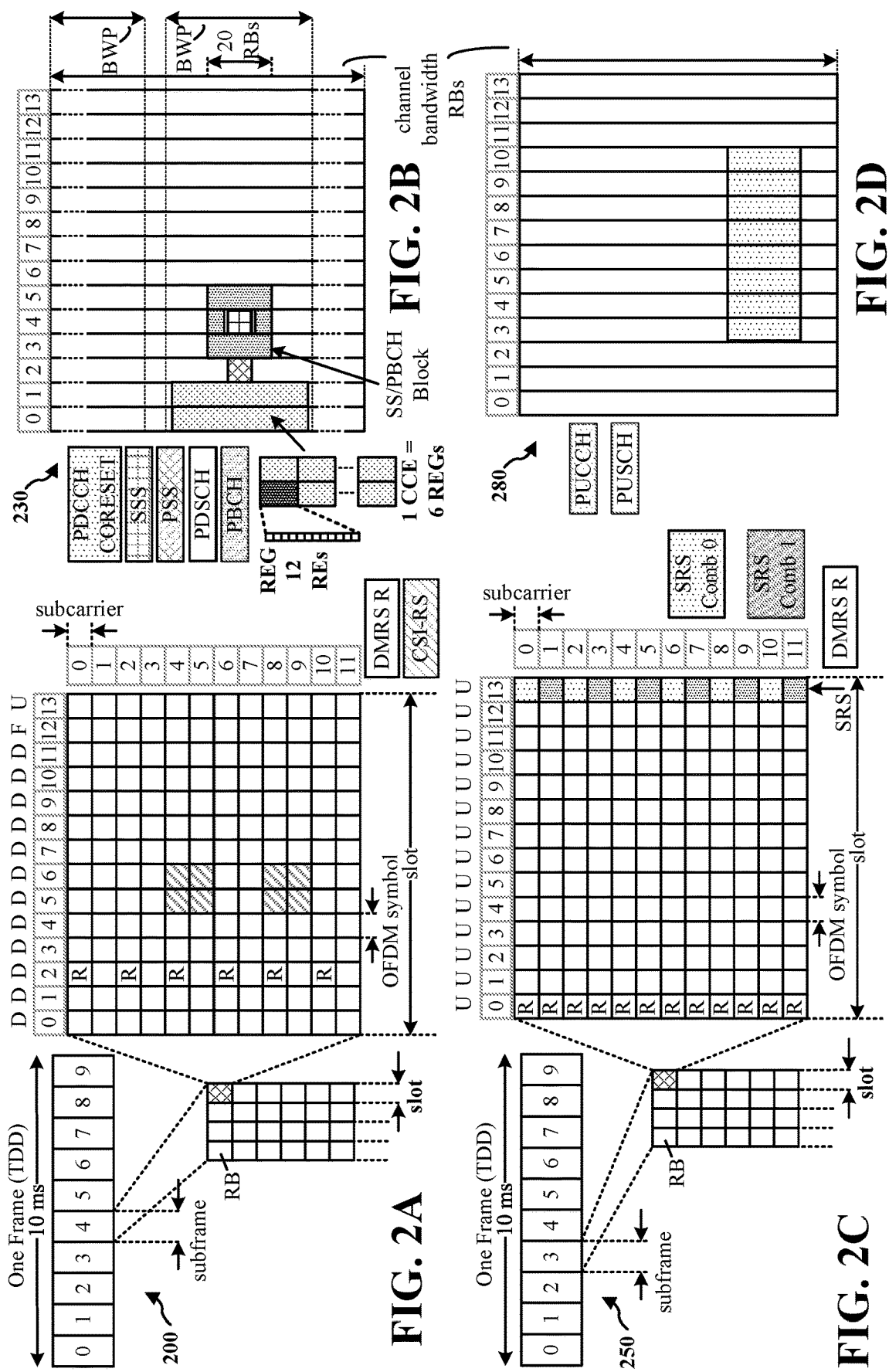
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| $\mu$ | SCS $\Delta f = 2^\mu \cdot 15 [\text{kHz}]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
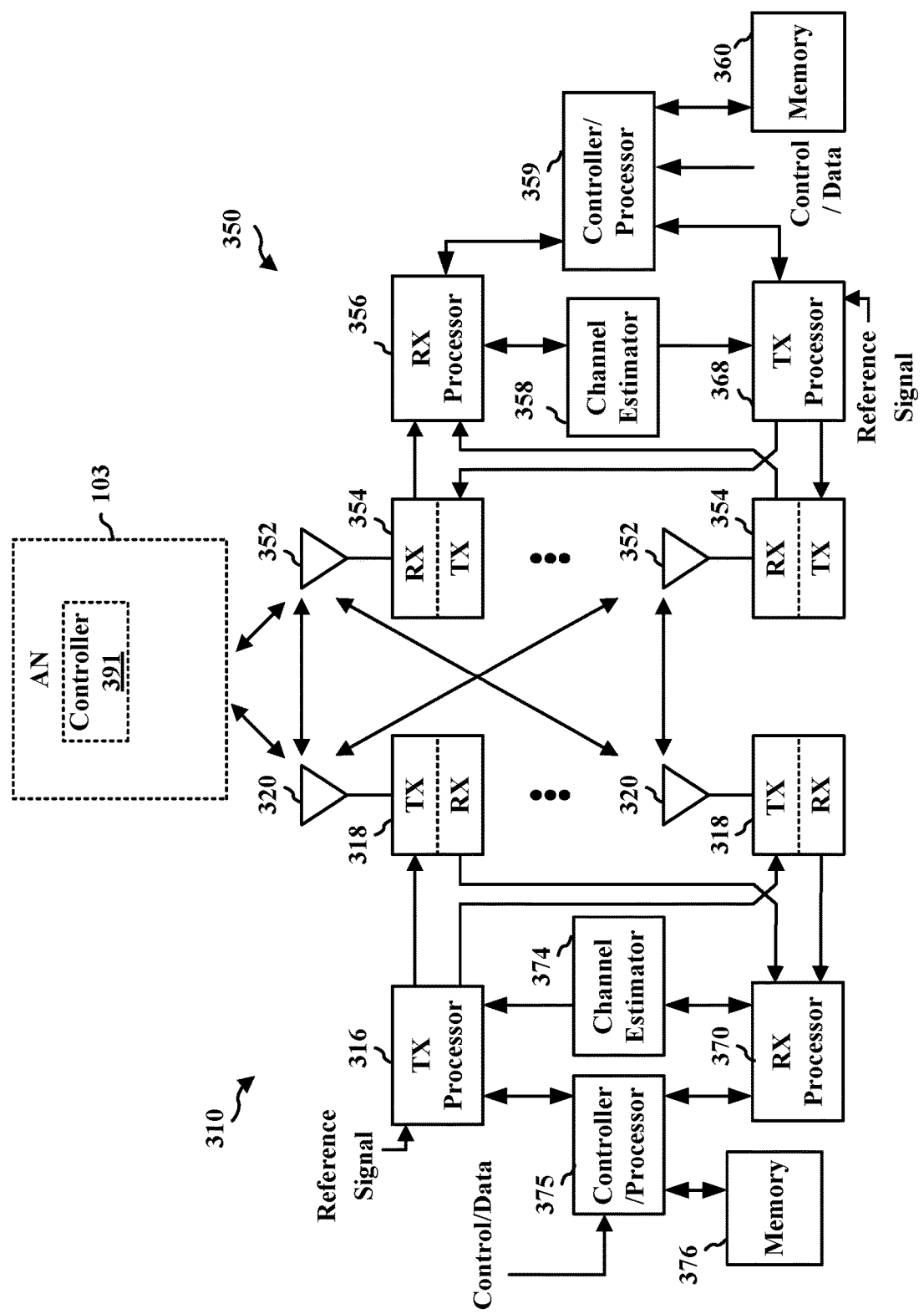
FIG. 3 is a diagram illustrating an example of a base station and user equipment (UE) in an access network.
Figure 4A:
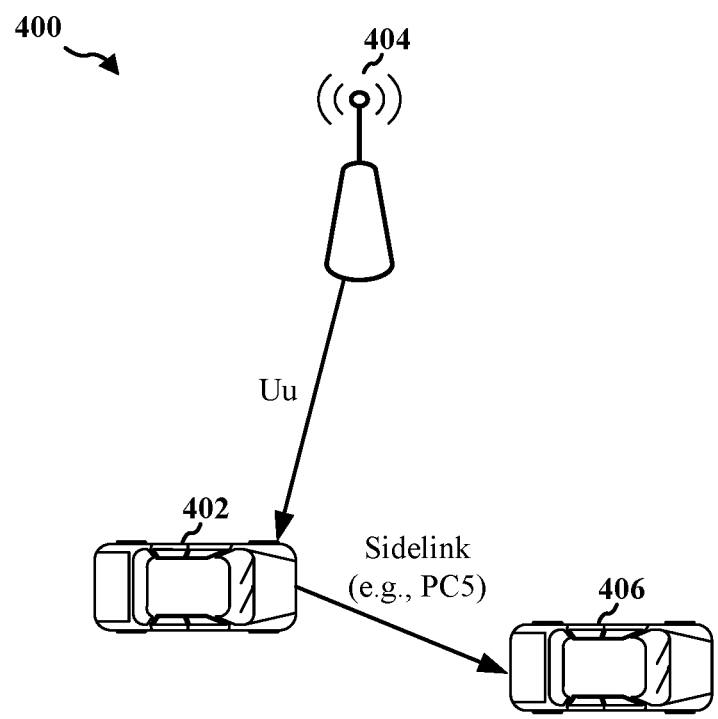
FIG. 4A is a diagram of a sidelink communication system.
Figure 4B:
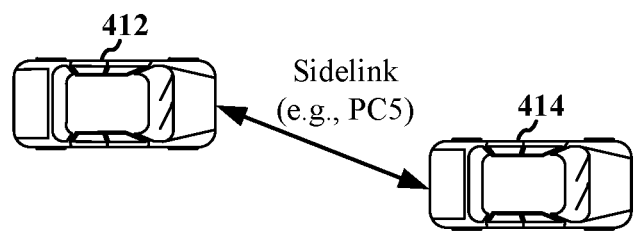
FIG. 4B is a diagram of a sidelink communication system.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

In some aspects, communication may be provided between the base station and the UE by an AN 103 (e.g., reconfigurable intelligent surface (RIS) or smart repeater), such as described in connection with any of FIG. 1 or FIGS. 4A-15. In some instances, the communication may be relayed or intelligently reflected by the AN 103 (e.g., RIS or smart repeater).

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

At least one of the TX processor 316, the RX processor 370, and the controller/processor 375 may be configured to perform aspects in connection with 198 of FIG. 1.

In wireless communications systems, for example sidelink communication systems, a Mode 1 and Mode 2 resource allocation configuration may be utilized. For example, with reference to diagram 400 of FIG. 4A, in a Mode 1 resource allocation configuration, a base station 404 may allocate resources to a transmitting UE 402 for sidelink data channel transmission. The transmitting UE 402 may receive the allocated resources from the base station 404 over a Uu link. The transmitting UE 402 may transmit a sidelink transmission to the receiving UE 406 over a sidelink connection (e.g., PC5). With reference to diagram 410 of FIG. 4B, in a Mode 2 resource allocation configuration, the transmitting UE 412 may perform resource allocation autonomously, on its own, for sidelink transmission with the receiving UE 414. Mode 2 may support reservation-based scheduling. The transmitting UE 412 may reserve a number of resources in a number of future slots for a future transmission. The reservation may be indicated in sidelink control information (SCI). The transmitting UE 412 may make the reservation based on monitoring of sidelink transmissions from other UEs.

An assisting node (AN) may be utilized to enhance or extend wireless coverage. For example, the AN may be used to duplicate data packets in order to increase reliability. A type of an AN may comprise a reconfigurable intelligent surface (RIS). A RIS may comprise a phased array without a transceiver and may include a plurality of uniformly distributed electrically controllable elements. Each RIS element may have a reconfigurable electromagnetic characteristic, e.g., a reflection coefficient. Depending on the combination of configured states of the elements, the RIS may reflect and modify the incident radio waveform in a controlled manner, such as changing a reflected direction, changing a beam width, etc. The RIS may function as a near passive device, and a reflection configuration of the RIS may be controlled by the base station. The RIS may reflect an impinging wave based on the reflection configuration indicated by the base station to a UE.

Figure 5:
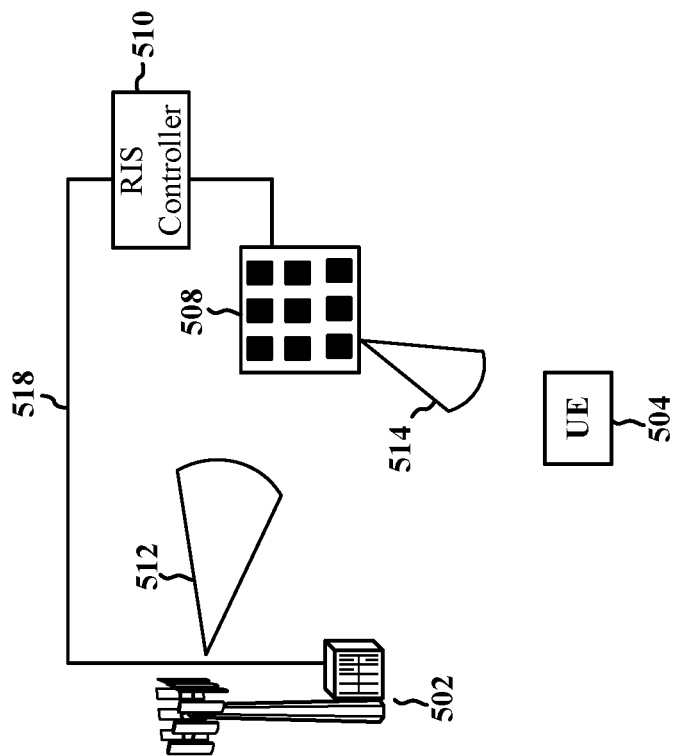
FIG. 5 is a diagram of a base station and a RIS.

An RIS may be deployed in wireless communication systems, including cellular systems, such as LTE, NR, etc. An RIS may alter the channel realization in a controlled manner, which may improve channel diversity. The increased diversity may provide robustness to channel blocking/fading, which may be of particular importance for mmWave communication. An RIS may improve network coverage, throughput, or reduce power consumption. For example, the RIS may reflect signals towards coverage holes with a reduced power requirement. An RIS may have a controller and one or more antenna arrays. The controller may control the antenna array to receive or reflect signals towards desired directions. The controller may communicate with other nodes, such as base stations. With reference to FIG. 5, the base station 502 may have a connection with a RIS controller 510 of the RIS 508 to provide a control signal 518 which may comprise a RIS configuration. The base station 502 may provide the control signal 518 to change the reflection configuration at the RIS 508, such that the signal 512 from the base station 502 may be reflected at signal 514 towards UE 504. In some aspects, the control signal 518 may instruct the RIS 508 to change the reflection configuration such that the signal 512 from the base station 502 may be reflected to another direction.

At least another type of AN may comprise a smart repeater. A smart repeater may amplify a received signal and forwards the received signal. The smart repeater may be able to control its receiving beam direction and/or forwarding beam direction.

ANs (e.g., RIS or smart repeater) may assist in sidelink communication (e.g., vehicle to everything (V2X)). ANs may be deployed to improve sidelink communication performance. ANs may be deployed to assist Uu and may be used for sidelink communications. For example, when part of the resources are configured for sidelink communication and within those resources there are no Uu transmissions, then the AN may provide sidelink communication assistance in the configured sidelink resources. However, there may be some challenges in exploiting ANs for V2X communications. For example, the locations of the transmitter UE and receiver UE, for sidelink communications, may be dynamic, such that determining the signal directions for both incoming and outgoing beam directions may be difficult.

Aspects presented herein provide a configuration for on demand assistance for sidelink communication. In some instances, a UE may be configured to request assistance with sidelink communication with at least another UE. A base station may manage the configuration of one or more ANs associated with the base station. For example, the base station may configure at least one AN to assist a transmitting UE with sidelink transmission with a receiving UE, in response to receiving an assistance request from the UE.

Figure 6:
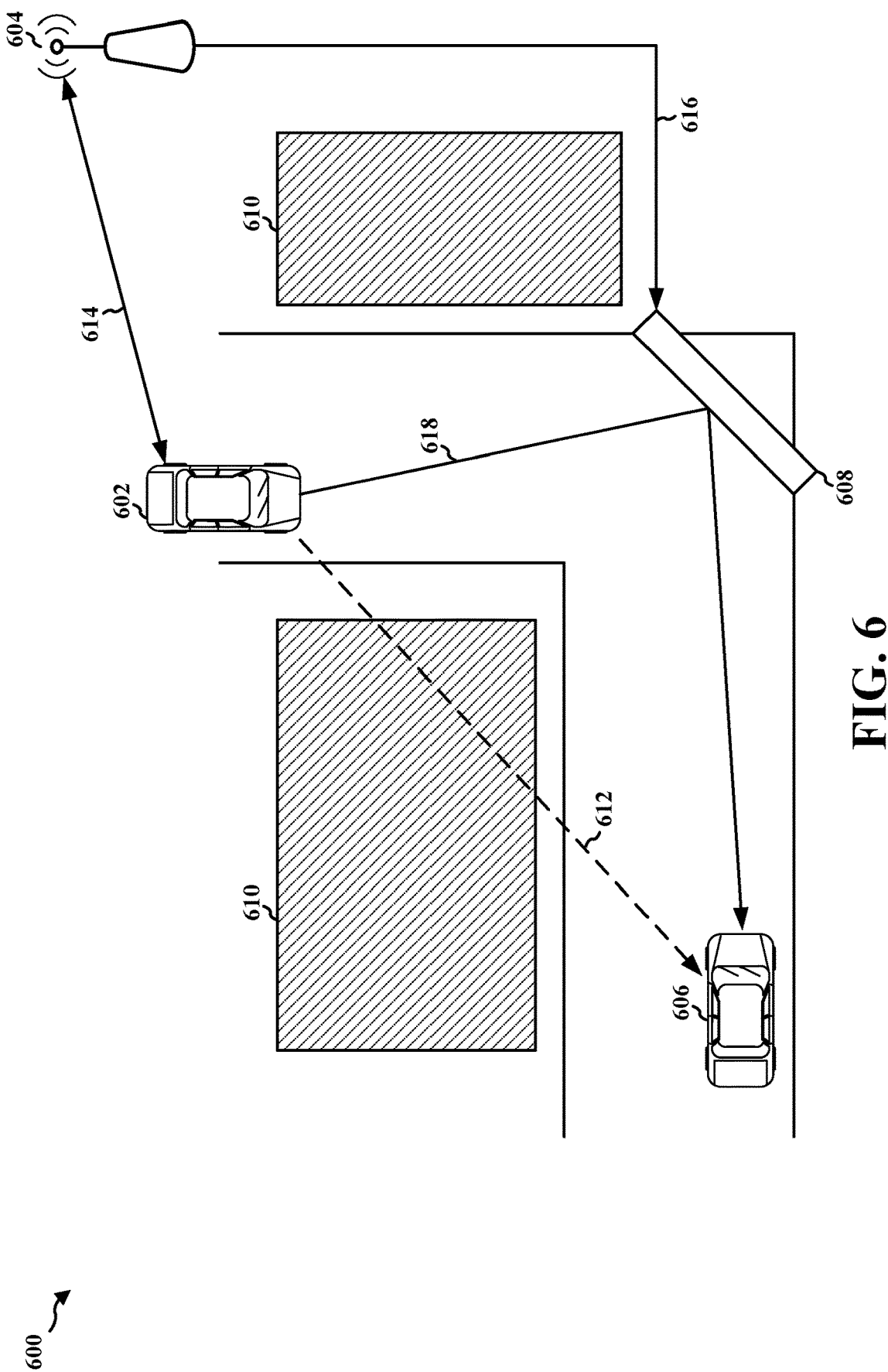
FIG. 6 is a diagram illustrating an example of AN assisted sidelink communication.

FIG. 6 is a diagram 600 of an AN assisted sidelink communication. The diagram 600 includes a first UE 602, a base station 604, a second UE 606, and an AN 608. The UE 602 may be a transmitting UE and UE 606 may be a receiving UE. The UE 602 may not have a line of sight or connection 612 that would support sidelink transmission. The UE 602 may be blocked by obstructions 610 that block sidelink transmissions from the UE 602 to the UE 606. The obstructions 610 may comprise a building, walls, obstacles, or interference sources that prevent or degrade sidelink transmissions from the UE 602 to the UE 606.

The UE 602 may have a Uu link 614 with the base station 604. In such instances, the base station 604 may transmit, to the UE 602, AN support and capability information over the Uu link 614. For example, the base station 604 may broadcast a signal indicating an AN configuration. The AN configuration may indicate that the one or more ANs are associated with the base station 604, location information for the one or more ANs, or incoming or outgoing signal directions supported by each of the one or more ANs. In some instances, the base station 604 may transmit the AN configuration in dedicated RRC signaling.

The UE 602, in response to receipt of the AN configuration, may determine whether any of the one or more ANs associated with the base station 604 may provide assistance with sidelink communications with the UE 606. For example, the UE 602 may determine that it is located within at least one incoming signal direction of the AN 608, and that the UE 606 is located within at least one outgoing signal direction of the AN 608, such that the AN 608 may be identified, by the UE 602, as being capable of providing assistance in sidelink communication between the UE 602 and UE 606. In some instances, the UE 602 may take into the quality of the link 612 between the UE 602 and UE 606 to identify an AN associated with the base station 604 that may provide sidelink communication assistance. The quality of the link 612 may be based on at least one of low signal to noise ratio (SNR), low reference signal received power (RSRP), increased block error rate, or low modulation and coding scheme (MCS) index. The UE 602 may have location information of the UE 606 in order to make a determination based on the quality of the link 612.

The UE 602 may transmit an AR to the base station 604 via the Uu link 614. The AR may request assistance for sidelink communication with the UE 606 from the AN 608. The AR transmitted to the base station 604 may indicate a desired incoming/outgoing signal directions, or a desired AN. The desired incoming/outgoing signal directions may correspond to a location of the UE 602 and a location of the UE 606. The AR may comprise a dedicated MAC-CE, may be part of a scheduling request (SR), or within a buffer status report (BSR) used in Mode 1 sidelink communication. In some aspects, the UE 602 may indicate, within the AR, location information for the UE 602 and an intended location of the UE 606.

The base station 604, in response to receipt of the AR from UE 602, may allocate resources to schedule sidelink transmission between the UE 602 and the UE 606, with the assistance of AN 608. The base station 604, in allocating the resources to schedule the sidelink transmission, may identify at least one AN associated with the base station that may be capable of providing assistance to the UE 602. The base station 604 may identify the at least one AN regardless of whether a desired AN or an AN is identified in the AR transmitted by the UE 602. In some aspects, the base station 604 may activate the AN 608 in the resources that have been allocated to the UE 602 for the sidelink transmission. The base station 604 may transmit an activation signal to the AN 608 via a connection 616. The base station 604 may transmit a grant to the UE 602 with resources allocated that schedule the sidelink transmission. In some aspects, the base station 604 may inform the UE 602 whether the AN 608 (e.g., desired or identified in the AR) or the desired incoming/outgoing signal directions will be available on the allocated resources. In some instances, the desired AN may not be available to the UE 602, for example, due to the desired AN serving other UEs or links.

The UE 602 may transmit the sidelink transmission based on the allocated resources in the grant from the base station 604. The UE 602 may transmit the sidelink transmission in a direction 618 towards the AN 608. For example, the UE 602 may form a beam towards the AN 608 and may select a higher MCS. In some aspects, the UE 602 may transmit the sidelink transmission towards the AN 608 based on the grant indicating that the AN 608 will be activated during the allocated resources. For example, the sidelink transmission beam direction may be different for an active AN and for a deactivated AN.

Figure 7:
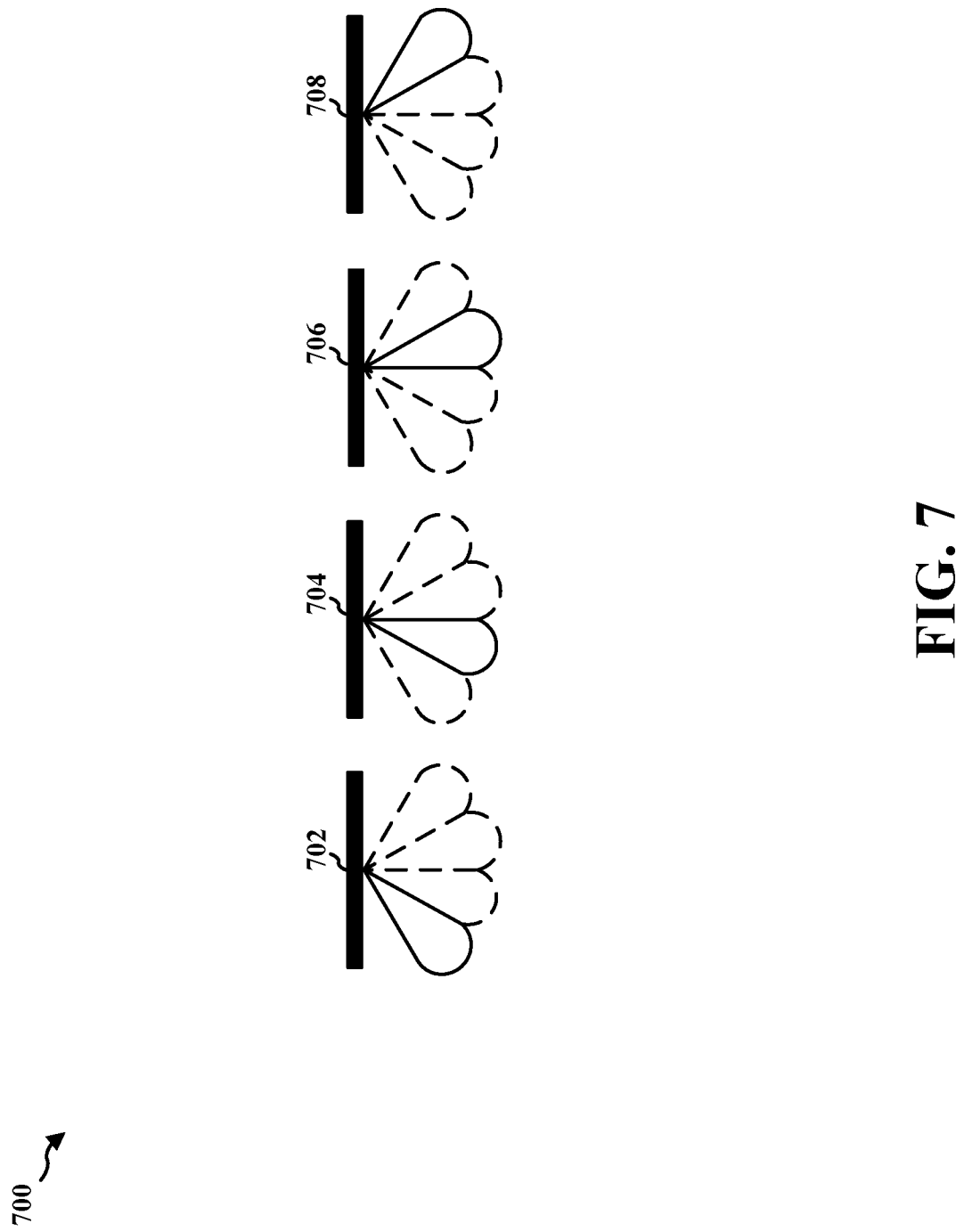
FIG. 7 is a diagram illustrating an example of beam configurations for an AN.
Figure 8:
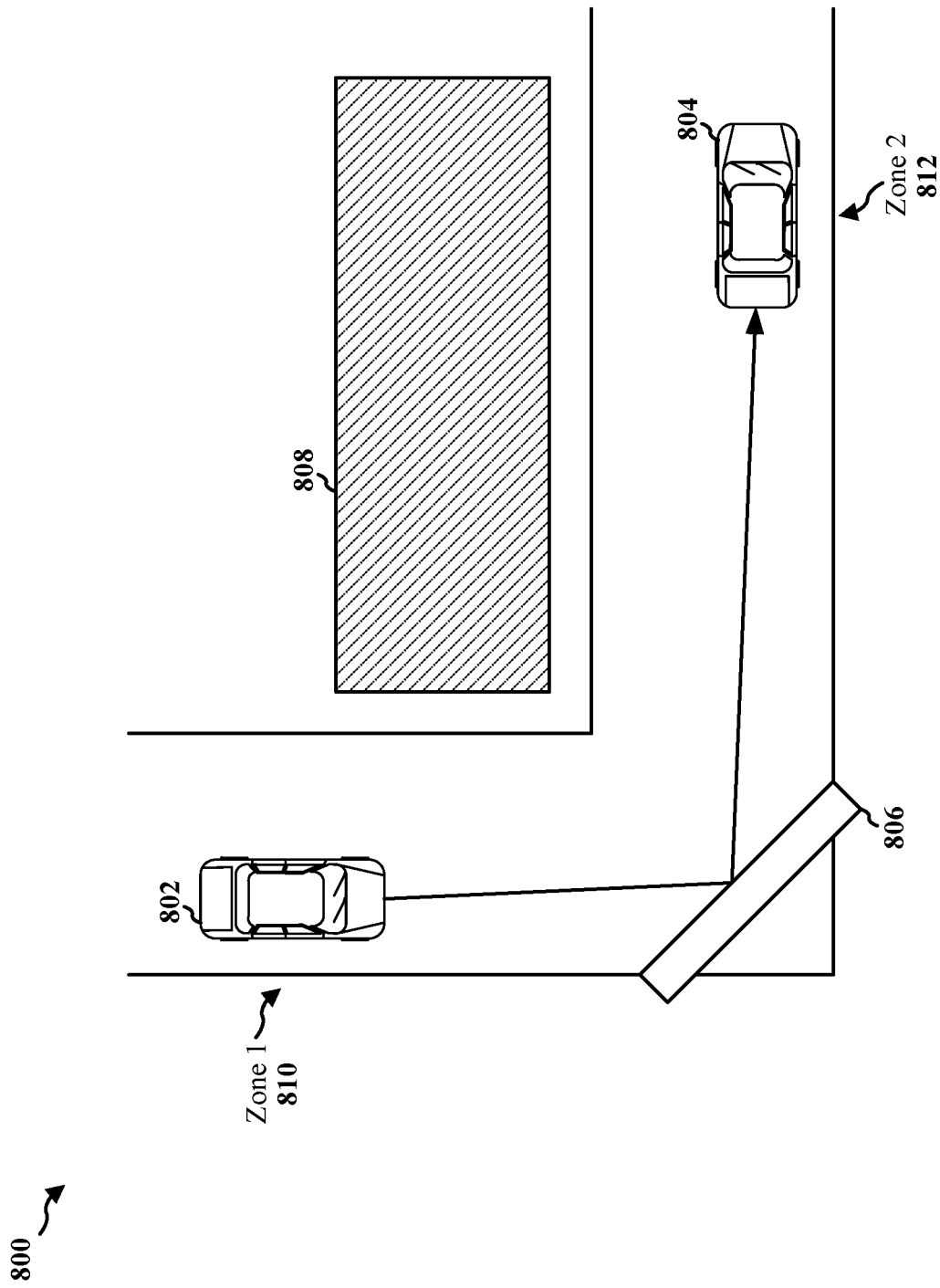
FIG. 8 is a diagram illustrating an example of AN assisted sidelink communication.

The AN may support multiple incoming and outgoing signal direction pairs. For example, with reference to example 700 of FIG. 7, the AN may comprise a RIS that may be configured to tune its signal phase such that the RIS may reflect a signal towards one of multiple directions (e.g., 702, 704, 706, 708). The example 700 of FIG. 7 shows that the RIS may reflect the signal towards four different directions, however, in some aspects, the RIS may be configured to reflect the signal towards more than four different directions and the disclosure is not intended to be limited to four different directions. In some aspects, the AN may be stationary, such that the configuration of the AN may be based on location information of the AN and the one or more UEs. For example, in instances where the transmitting UE has line of sight with the AN, the incoming signal direction of the AN that should be activated may be based on the location of the transmitting UE and the location of the AN, or the relative position between the transmitting UE and the AN. The location information of the AN, transmitting UE, or receiving UE may be utilized to determine which incoming/outgoing signal direction combination should be used, which may reduce AN beam training overhead. In some instances, when exchanging location information between the base station and the transmitting UE, the location information may be geographical coordinates, zone identifier (ID), or even coarser (e.g., AN located at a street intersection, the four road directions around the intersection abstracted as four zones). For example, with reference to example 800 of FIG. 8, the transmitting UE 802 may be within a Zone 1 810 while the receiving UE 804 may be within a Zone 2 812. The AN 806 (e.g., RIS or smart repeater) may assist in sidelink communication between UE 802 and UE 804 that are in zones (e.g., Zone 1 810, Zone 2 812) that have a connection with AN 806. Zone 1 810 and Zone 2 812 may be within incoming/outgoing beam directions of the AN 806, such that the AN 806 may provide sidelink transmission assistance. In some aspects, the base station may include the zone information within the AN configuration. The transmitting UE may request AN assistance based at least on which zone the transmitting UE and the receiving UE are located.

In some aspects, the AN may be co-located with a road side unit (RSU), such that the AN is stationary and co-located with the RSU at street intersections. In some aspects, the AN may be deployed as a stand-alone device, but may have a sidelink or V2X transceiver and capable of sidelink or V2X communication. In some aspects, the AN may be deployed as a stand-alone device and may be capable of communicating with a network entity (e.g., base station) via a Uu link, cabled backhaul, or other connection means. The AN may be controlled by a controller or by the network. The controller may be a co-located RSU or another entity (e.g., integrated or co-located with the AN). In some aspects, the controller may be the base station that the AN is capable of communicating with. In some aspects, the controller may be able to activate or deactivate the AN or change the incident signal direction or receiving beam direction for incoming signal and reflected signal direction or transmitting beam direction for the outgoing signal.

In some aspects, the determination of the desired incoming/outgoing signal directions may be determined by the transmitting UE. For example, the base station may transmit to the transmitting UE supported combinations of AN incoming/outgoing signal directions. The UE may determine the desired combination based on its location and the location of the receiving UE. The UE may provide the desired incoming/outgoing signal directions within the AR transmitted to the base station. In some aspects, the determination of the desired incoming/outgoing signal directions may be determined by the base station. For example, the base station may signal the AN capability within a broadcast signal to at least one UE. The transmitting UE may report its location, as well as the location of the receiving UE to the base station within the AR. The base station may determine whether the AN or beam direction combination is available to assist the transmitting UE, based at least on the locations of the transmitting UE, receiving UE, and the AN. The base station may indicate to the transmitting UE whether the AN is available or whether the direction combination is available.

In some aspects, the AN may assist the reverse link from the receiving UE to the transmitting UE. The transmitting UE may report an ID for the receiving UE (e.g., layer 2 ID) to the base station, within the AR. The base station may associate the ID of the receiving UE with its Uu ID (e.g., RNTI), such that when the base station schedules the sidelink transmission from the receiving UE to the transmitting UE, the base station may activate or configure the AN to assist the sidelink transmission from the receiving UE to the transmitting UE based at least on the earlier transmitting UE request.

Figure 9:
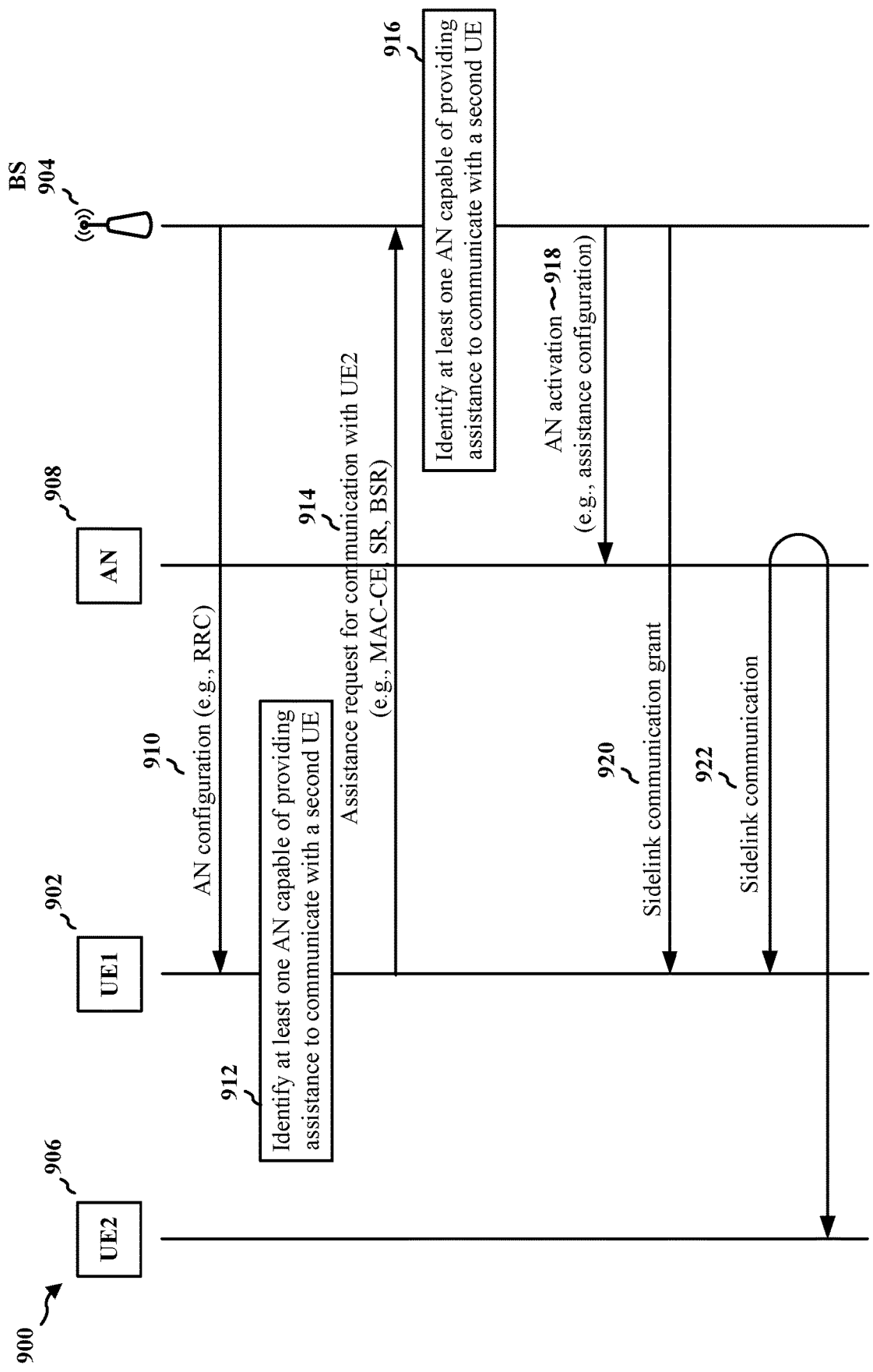
FIG. 9 is a call flow diagram of signaling between a first UE, a base station, an AN, and a second UE.

FIG. 9 is a call flow diagram 900 of signaling between a first UE 902, a base station 904, a second UE 906, and an AN 908. The base station 904 may be configured to provide at least one cell. The UE 902, 906 may be configured to communicate with the base station 904. The AN 908 may be configured to communicate with the base station 904 or the UE 902,906. For example, in the context of FIG. 1, the base station 904 may correspond to base station 102/180 and, accordingly, the cell may include a geographic coverage area 110 in which communication coverage is provided and/or small cell 102' having a coverage area 110'. Further, the UE 902, 906 may correspond to at least UE 104, and the AN 908 may correspond to the AN 103. In another example, in the context of FIG. 3, the base station 904 may correspond to base station 310 and the UE 902, 906 may correspond to UE 350.

As illustrated at 910, the base station 904 may transmit an AN configuration. The base station may transmit the AN configuration to at least a first UE 902. The first UE 902 may receive the AN configuration from the base station 904. The AN configuration may be for one or more ANs (e.g., 908) associated with the base station 904. In some aspects, the AN configuration may comprise an amount of ANs associated with the base station, location information for each of the one or more ANs, or signal directions supported by each of the one or more ANs. The signal directions supported may comprise pairs of transmission and/or reception beams that may be supported by the one or more ANs. In some aspects, the AN configuration may be transmitted via RRC signaling.

As illustrated at 912, the first UE 902 may identify at least one AN (e.g., 908) that may be capable of providing assistance to communicate with a second UE 906. In some aspects, the at least one AN may be capable of providing assistance based at least on position location information of the first UE or the second UE. For example, the first UE may not have line of sight or a strong connection with the second UE, but the AN may have line of sight or a strong connection with the second UE. In such instances, the AN may be capable of providing assistance in the sidelink communication between the first and second UE. In some aspects, the at least one AN may be capable of providing assistance with the sidelink transmission between the first UE and the second UE if the first UE and the second UE are in different location zones. In such instances, the different location zones may have a connection with the at least one AN that allows for the at least one AN to relay sidelink transmissions between the first and second UEs. In some aspects, at least one incoming signal direction of the at least one AN may support transmission from the first UE, and at least one outgoing signal direction of the at least one AN may support transmission to the second UE.

As illustrated at 914, the first UE 902 may transmit an AR to request assistance with communication with the second UE 906. The first UE 902 may transmit the AR to the base station 904. The base station 904 may receive the AR from the first UE 902. The first UE 902 may transmit the AR to request assistance with communication with the second UE 906 from at least one AN (e.g., 908) associated with the base station 904. In some aspects, the AR may comprise at least one of a desired incoming signal direction, an outgoing signal direction, or a desired AN. In some aspects, the AR may be transmitted in at least one of a MAC-CE, an SR, or a BSR. In some aspects, the AR may comprise location information for at least one of the first UE or the second UE. In some aspects, the at least one AN identified as capable of providing assistance may be indicated in the AR.

As illustrated at 916, the base station 904 may identify at least one AN (e.g., 908) that may be capable of providing assistance with the sidelink communication between the first UE 902 and the second UE 906. The base station 904 may identify the at least one AN that may be capable of providing assistance with the sidelink communication between the first UE 902 and the second UE 906 in instances where the AR transmitted by the first UE 902 does not include a desired AN or does not indicate an AN identified by the first UE as being capable of providing assistance. In some aspects, the base station 904 may identify the at least one AN capable of providing assistance regardless of whether the AR includes a desired AN or includes an AN identified by the first UE as being capable of providing assistance. In some aspects, the at least one AN may be capable of providing assistance based at least on position location information of the first UE or the second UE. For example, the first UE may not have line of sight or a strong connection with the second UE, but the AN may have line of sight or a strong connection with the second UE. In such instances, the AN may be capable of providing assistance in the sidelink communication between the first and second UE. In some aspects, the at least one AN may be capable of providing assistance with the sidelink transmission between the first UE and the second UE if the first UE and the second UE are in different location zones. In such instances, the different location zones may have a connection with the at least one AN that allows for the at least one AN to relay sidelink transmissions between the first and second UEs. In some aspects, at least one incoming signal direction of the at least one AN may support transmission from the first UE, and at least one outgoing signal direction of the at least one AN may support transmission to the second UE.

As illustrated at 918, the base station 904 may activate the at least one AN (e.g., 908). The base station may activate the at least one AN to assist in the sidelink transmission between the first UE and the second UE. In some aspects, the at least one AN may be configured, by the base station, to assist in the sidelink transmission between the first UE and the second UE in response to the AR. In some aspects, the base station may configure the at least one AN to activate incoming signal direction beams or outgoing signal direction beams based at least on location information of the first UE or the second UE and the at least one AN. In some aspects, the base station may configure the at least one AN to activate one or more incoming or outgoing signal direction beam pairs. The at least one AN may support multiple incoming and outgoing signal direction pairs. For example, the at least one AN may comprise an RIS that may be able to tune signal phase such that the RIS may reflect signals towards one of multiple directions. The RIS may be able to tune its phase towards an incident signal direction so the RIS may cover multiple directions.

As illustrated at 920, the base station 904 may transmit a grant to schedule sidelink transmission between the first UE and the second UE. The base station may transmit the grant, to the first UE 902, to schedule the sidelink transmission between the first UE and the second UE. The first UE 902 may receive the grant to schedule the sidelink transmission from the base station 904. The sidelink transmission between the first UE and the second UE may be assisted (e.g., relayed) by at least one AN (e.g., 908) of the one or more ANs associated with the base station. In some aspects, the grant may indicate at least one of an incoming signal direction or an outgoing signal direction of the at least one AN. In some aspects, the grant may indicate whether the at least one AN is available to assist the sidelink transmission of the first UE. In some instances, the at least one AN may not be available to assist in the sidelink transmission between the first UE and the second UE. In some instances, the at least one AN may be available to assist in the sidelink transmission between the first UE and the second UE and the grant may provide allocated resources for the sidelink transmission. In some aspects, the at least one AN may comprise at least one of a smart repeater or a RIS. In some aspects, the one or more ANs may be configured to support one or more incoming or outgoing signal direction pairs.

As illustrated at 922, the first UE 902 may communicate with the second UE 906. The first UE 902 may communicate with the second UE 906 using allocated resources of the grant from the base station. The UE may communicate with the second UE via the at least one AN (e.g., 908). For example, the at least one AN may relay the sidelink transmission from the first UE 902 to the second UE 906. In some aspects, the at least one AN may assist in sidelink communications between the second UE 906 and the first UE 902.

Figure 10:
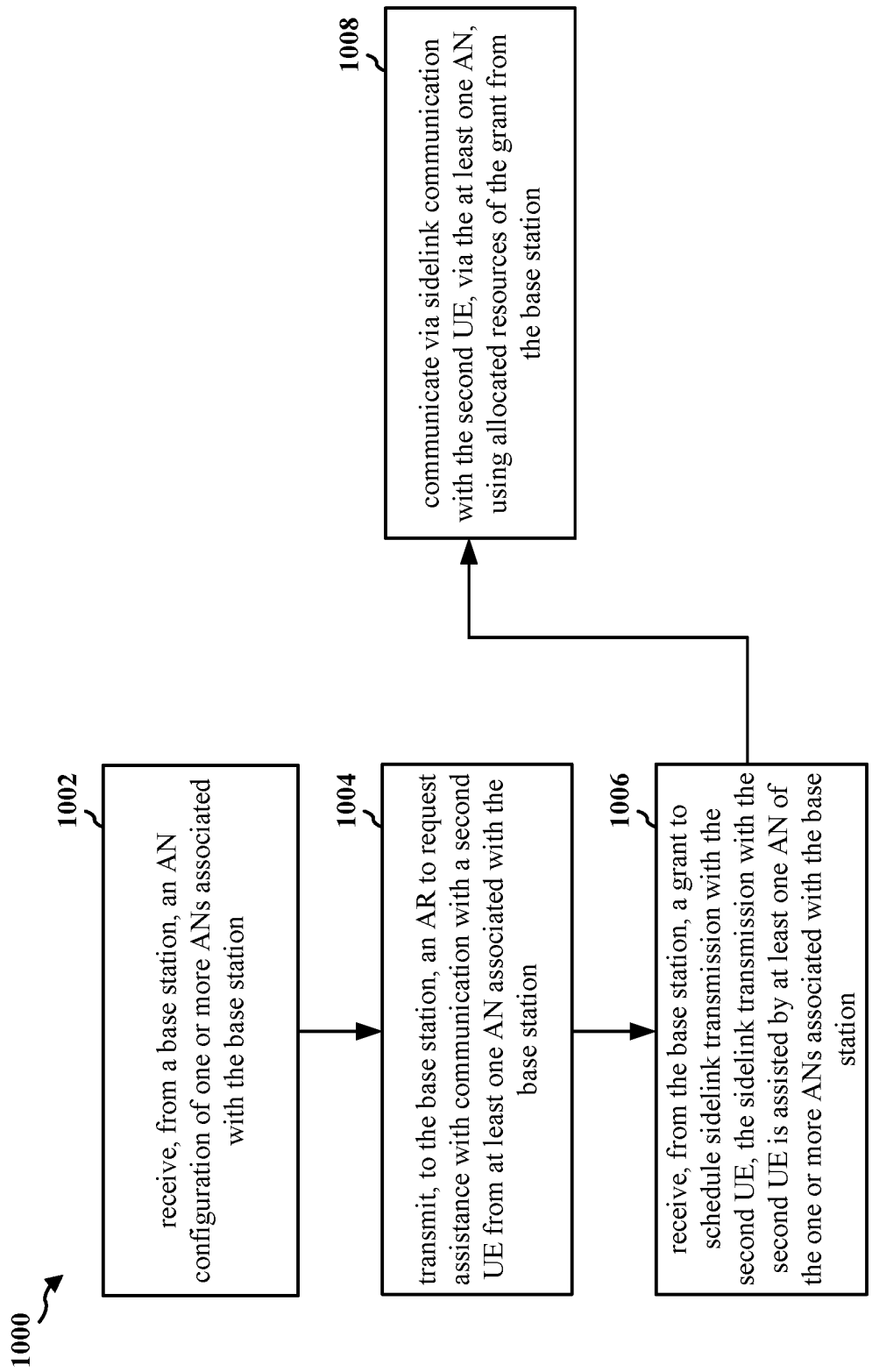
FIG. 10 is a flowchart of a method of wireless communication.

FIG. 10 is a flowchart 1000 of a method of wireless communication. The method may be performed by a UE or a component of a UE (e.g., the UE 104; the apparatus 1202; the cellular baseband processor 1204, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to request assistance with sidelink communication with at least another UE.

At 1002, the UE may receive an AN configuration. For example, 1002 may be performed by configuration component 1240 of apparatus 1202. The UE may receive the AN configuration from the base station. The AN configuration may be for one or more ANs associated with the base station. In some aspects, the AN configuration may comprise an amount of ANs associated with the base station, location information for each of the one or more ANs, or signal directions supported by each of the one or more ANs. The signal directions supported may comprise pairs of transmission and/or reception beams that may be supported by the one or more ANs. In some aspects, the AN configuration may be transmitted via RRC signaling.

At 1004, the UE may transmit an AR to request assistance with communication with a second UE. For example, 1004 may be performed by request component 1244 of apparatus 1202. The UE may transmit the AR to the base station. The UE may transmit the AR to request assistance with communication with the second UE from at least one AN associated with the base station. In some aspects, the AR may comprise at least one of a desired incoming signal direction, an outgoing signal direction, or a desired AN. In some aspects, the AR may be transmitted in at least one of a MAC-CE, an SR, or a BSR. In some aspects, the AR may comprise location information for at least one of the first UE or the second UE.

At 1006, the UE may receive a grant to schedule sidelink transmission with the second UE. For example, 1006 may be performed by grant component 1246 of apparatus 1202. The UE may receive the grant to schedule the sidelink transmission with the second UE from the base station. The sidelink transmission with the second UE may be assisted by at least one AN of the one or more ANs associated with the base station. In some aspects, the grant may indicate at least one of an incoming signal direction or an outgoing signal direction of the at least one AN. In some aspects, the grant may indicate whether the at least one AN is available to assist the sidelink transmission of the first UE. In some aspects, the atleast one AN may comprise atleast one of a smart repeater or a RIS. In some aspects, the one or more ANs may be configured to support one or more incoming or outgoing signal direction pairs.

At 1008, the UE may communicate via sidelink communication with the second UE. For example, 1008 may be performed by communication component 1248 of apparatus 1202. The UE may communicate via sidelink communication with the second UE using allocated resources of the grant from the base station. The UE may communicate with the second UE via the at least one AN.

Figure 11:
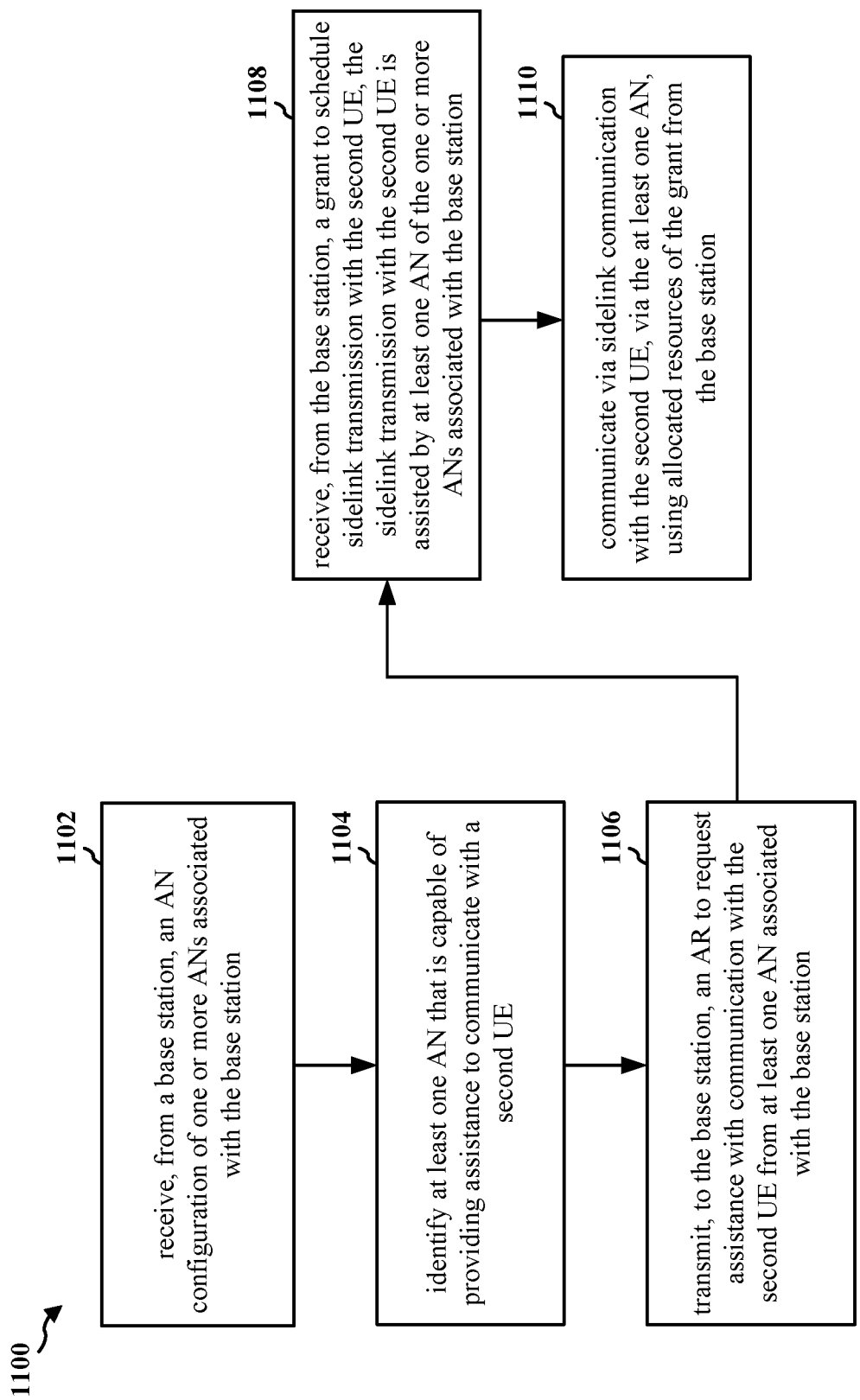
FIG. 11 is a flowchart of a method of wireless communication.

FIG. 11 is a flowchart 1100 of a method of wireless communication. The method may be performed by a UE or a component of a UE (e.g., the UE 104; the apparatus 1202; the cellular baseband processor 1204, which may include the memory 360 and which may be the entire UE 350 or a component of the UE 350, such as the TX processor 368, the RX processor 356, and/or the controller/processor 359). One or more of the illustrated operations may be omitted, transposed, or contemporaneous. The method may allow a UE to request assistance with sidelink communication with at least another UE.

At 1102, the UE may receive an AN configuration. For example, 1102 may be performed by configuration component 1240 of apparatus 1202. The UE may receive the AN configuration from the base station. The AN configuration may be for one or more ANs associated with the base station. In some aspects, the AN configuration may comprise an amount of ANs associated with the base station, location information for each of the one or more ANs, or signal directions supported by each of the one or more ANs. The signal directions supported may comprise pairs of transmission and/or reception beams that may be supported by the one or more ANs. In some aspects, the AN configuration may be transmitted via RRC signaling.

At 1104, the UE may identify at least one AN that may be capable of providing assistance to communicate with a second UE. For example, 1104 may be performed by identification component 1242 of apparatus 1202. In some aspects, the at least one AN may be capable of providing assistance based at least on position location information of the first UE or the second UE. For example, the first UE may not have line of sight or a strong connection with the second UE, but the AN may have line of sight or a strong connection with the second UE. In such instances, the AN may be capable of providing assistance in the sidelink communication between the first and second UE. In some aspects, the at least one AN may be capable of providing assistance with the sidelink transmission between the first UE and the second UE if the first UE and the second UE are in different location zones. In such instances, the different location zones may have a connection with the at least one AN that allows for the at least one AN to relay sidelink transmissions between the first and second UEs. In some aspects, at least one incoming signal direction of the at least one AN may support transmission from the first UE, and at least one outgoing signal direction of the at least one AN may support transmission to the second UE.

At 1106, the UE may transmit an AR to request assistance with communication with a second UE. For example, 1106 may be performed by request component 1244 of apparatus 1202. The UE may transmit the AR to the base station. The UE may transmit the AR to request assistance with communication with the second UE from at least one AN associated with the base station. In some aspects, the AR may comprise at least one of a desired incoming signal direction, an outgoing signal direction, or a desired AN. In some aspects, the AR may be transmitted in at least one of a MAC-CE, an SR, or a BSR. In some aspects, the AR may comprise location information for at least one of the first UE or the second UE. In some aspects, the at least one AN identified as capable of providing assistance may be indicated in the AR.

At 1108, the UE may receive a grant to schedule sidelink transmission with the second UE. For example, 1108 may be performed by grant component 1246 of apparatus 1202. The UE may receive the grant to schedule the sidelink transmission with the second UE from the base station. The sidelink transmission with the second UE may be assisted by at least one AN of the one or more ANs associated with the base station. In some aspects, the grant may indicate at least one of an incoming signal direction or an outgoing signal direction of the at least one AN. In some aspects, the grant may indicate whether the at least one AN is available to assist the sidelink transmission of the first UE. In some aspects, the atleast one AN may comprise atleast one of a smart repeater or a RIS. In some aspects, the one or more ANs may be configured to support one or more incoming or outgoing signal direction pairs.

At 1110, the UE may communicate via sidelink communication with the second UE. For example, 1110 may be performed by communication component 1248 of apparatus 1202. The UE may communicate via sidelink communication with the second UE using allocated resources of the grant from the base station. The UE may communicate with the second UE via the at least one AN.

Figure 12:
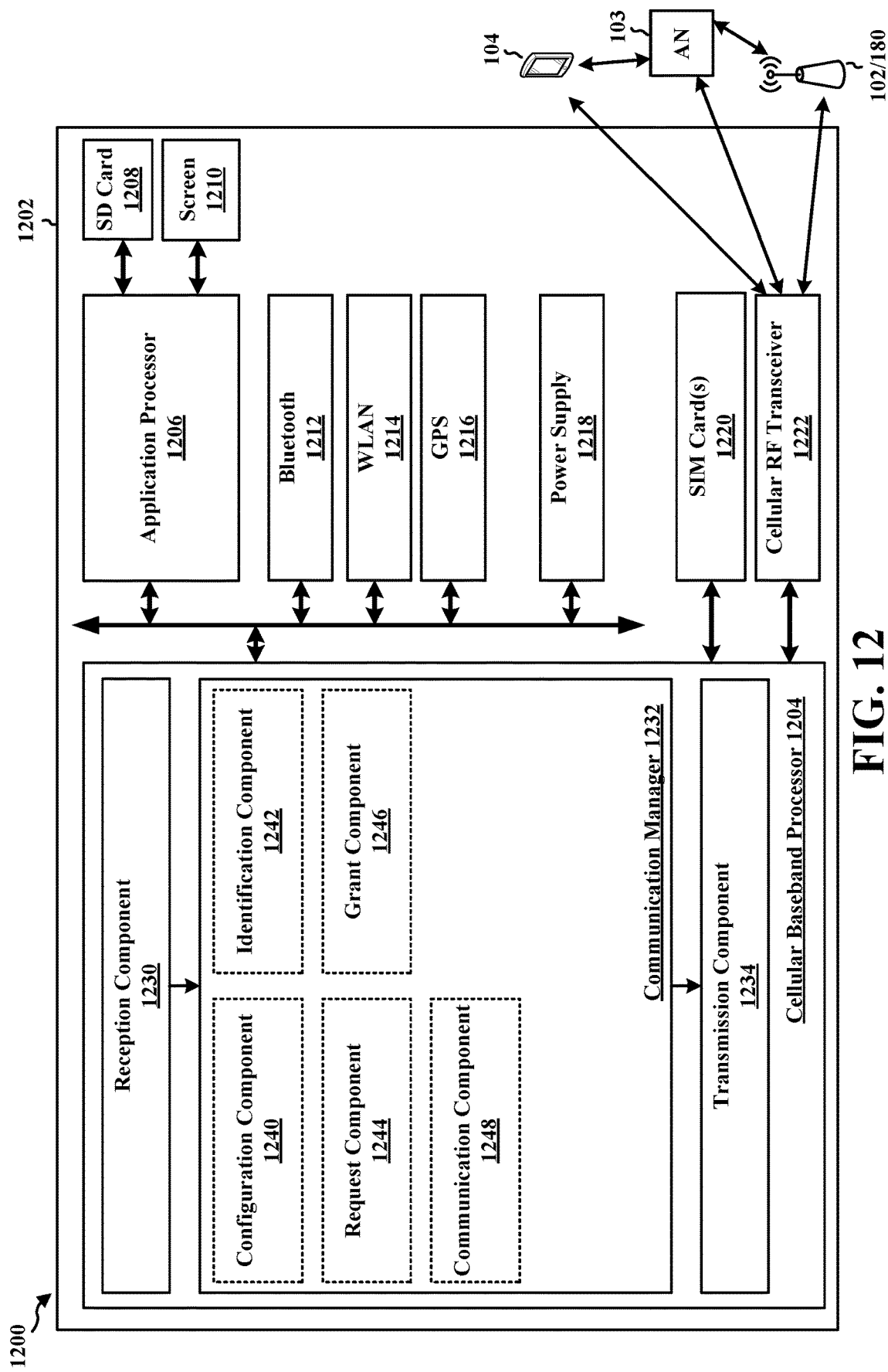
FIG. 12 is a diagram illustrating an example of a hardware implementation for an example apparatus.

FIG. 12 is a diagram 1200 illustrating an example of a hardware implementation for an apparatus 1202. The apparatus 1202 may be a UE, a component of a UE, or may implement UE functionality. In some aspects, the apparatus 1202 may include a cellular baseband processor 1204 (also referred to as a modem) coupled to a cellular RF transceiver 1222. In some aspects, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104, an AN 103, and/or BS 102/180. The cellular baseband processor 1204 may include a computer-readable medium/memory. The computer-readable medium/ memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202.

The communication manager 1232 includes a configuration component 1240 that is configured to receive an AN configuration, e.g., as described in connection with 1002 of FIG. 10 or 1102 of FIG. 11. The communication manager 1232 further includes an identification component 1242 that is configured to identify at least one AN that may be capable of providing assistance to communicate with a second UE, e.g., as described in connection with 1104 of FIG. 11. The communication manager 1232 further includes a request component 1244 that is configured to transmit an AR to request assistance with communication with a second UE, e.g., as described in connection with 1004 of FIG. 10 or 1106 of FIG. 11. The communication manager 1232 further includes a grant component 1246 that is configured to receive a grant to schedule sidelink transmission with the second UE, e.g., as described in connection with 1006 of FIG. 10 or 1108 of FIG. 11. The communication manager 1232 further includes a communication component 1248 that is configured to communicate via sidelink communication with the second UE, e.g., as described in connection with 1008 of FIG. 10 or 1110 of FIG. 11.

The apparatus may include additional components that perform each of the blocks of the algorithm in the flowcharts of FIG. 10 or 11. As such, each block in the flowcharts of FIG. 10 or 11 may be performed by a component and the apparatus may include one or more of those components. The components may be one or more hardware components specifically configured to carry out the stated processes/ algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for receiving, from a base station, an AN configuration for one or more ANs associated with the base station. The apparatus includes means for transmitting, to the base station, an AR to request assistance with communication with a second UE from at least one AN associated with the base station. The apparatus includes means for receiving, from the base station, a grant to schedule sidelink transmission with the second UE. The sidelink transmission with the second UE is assisted by at least one AN of the one or more ANs associated with the base station. The apparatus includes means for communicating via sidelink communication with the second UE, via the at least one AN, using allocated resources of the grant from the base station. The apparatus further includes means for identifying at least one AN that is capable of providing assistance to communicate with the second UE. The at least one AN identified as capable of providing assistance is indicated in the AR. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 13:
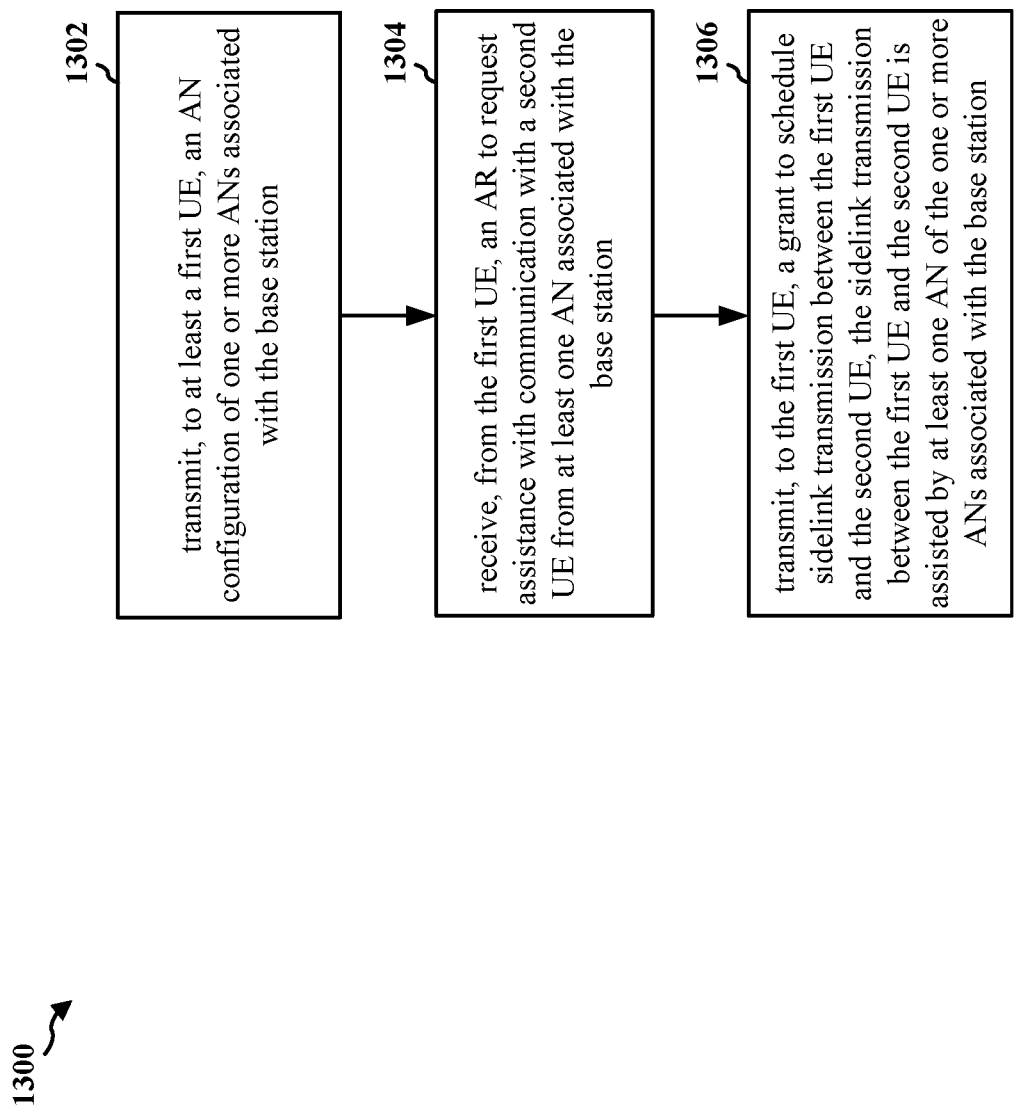
FIG. 13 is a flowchart of a method of wireless communication.

FIG. 13 is a flowchart 1300 of a method of wireless communication. The method may be performed by a base station or a component of a base station (e.g., the base station 102/180; the apparatus 1502; the baseband unit 1504, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to configure a UE to request assistance with sidelink communication with at least another UE.

At 1302, the base station may transmit an AN configuration. For example, 1302 may be performed by configuration component 1540 of apparatus 1502. The base station may transmit the AN configuration to at least a first UE. The AN configuration may be for one or more ANs associated with the base station. In some aspects, the AN configuration may comprise an amount of ANs associated with the base station, location information for each of the one or more ANs, or signal directions supported by each of the one or more ANs. The signal directions supported may comprise pairs of transmission and/or reception beams that may be supported by the one or more ANs. In some aspects, the AN configuration may be transmitted via RRC signaling.

At 1304, the base station may receive an AR to request assistance with communication with a second UE. For example, 1304 may be performed by request component 1542 of apparatus 1502. The base station may receive the AR from the first UE. The base station may receive the AR to request assistance with communication with the second UE from at least one AN associated with the base station. In some aspects, the AR may comprise at least one of a desired incoming signal direction, an outgoing signal direction, or a desired AN. In some aspects, the AR may be transmitted in at least one of a MAC-CE, an SR, or a BSR. In some aspects, the AR may comprise location information for at least one of the first UE or the second UE.

At 1306, the base station may transmit a grant to schedule sidelink transmission between the first UE and the second UE. For example, 1306 may be performed by grant component 1548 of apparatus 1502. The base station may transmit the grant, to the first UE, to schedule the sidelink transmission between the first UE and the second UE. The sidelink transmission between the first UE and the second UE may be assisted by at least one AN of the one or more ANs associated with the base station. In some aspects, the grant may indicate at least one of an incoming signal direction or an outgoing signal direction of the at least one AN. In some aspects, the grant may indicate whether the at least one AN is available to assist the sidelink transmission of the first UE. In some aspects, the at least one AN may comprise at least one of a smart repeater or a RIS. In some aspects, the one or more ANs may be configured to support one or more incoming or outgoing signal direction pairs.

Figure 14:
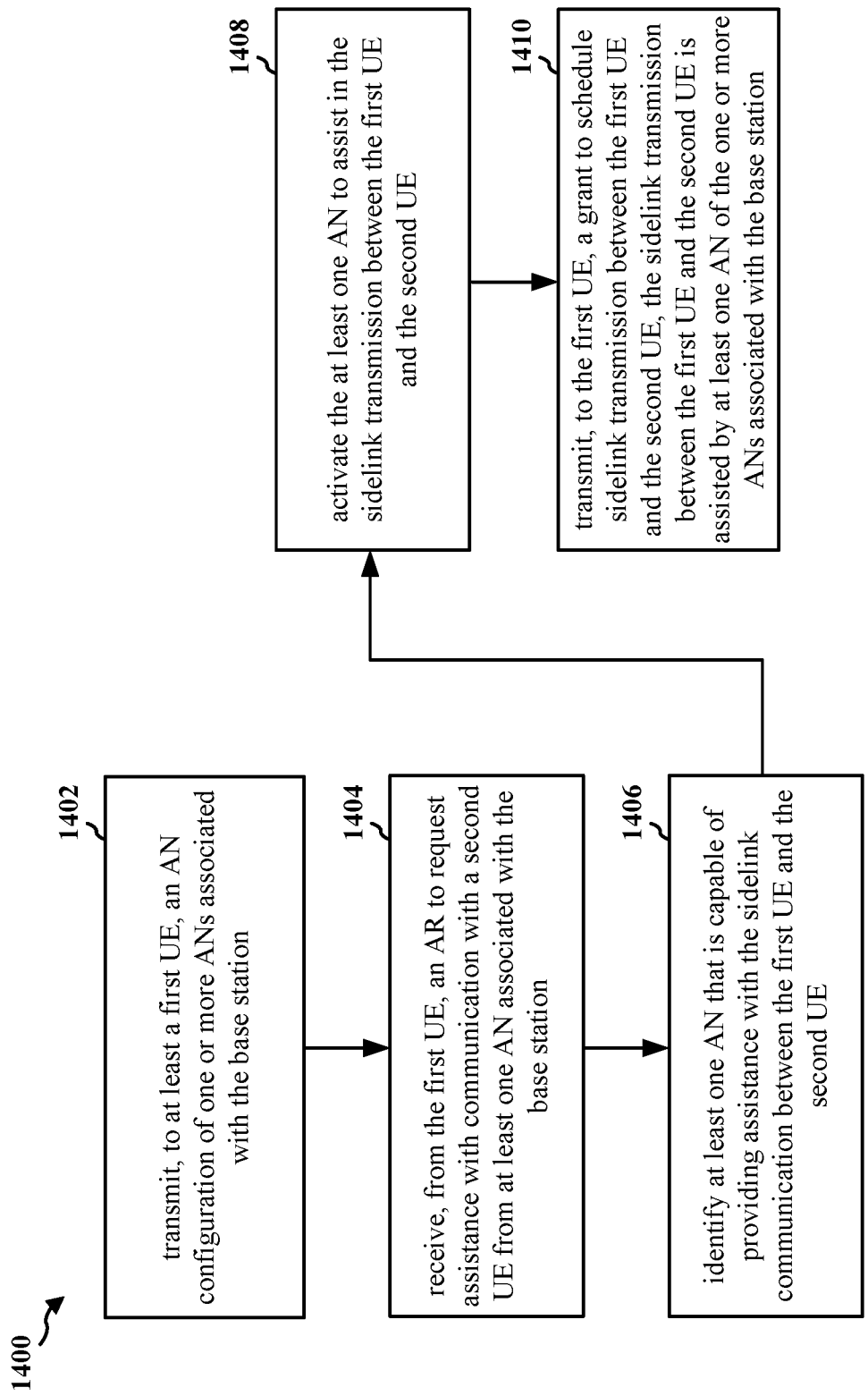
FIG. 14 is a flowchart of a method of wireless communication.

FIG. 14 is a flowchart 1400 of a method of wireless communication. The method may be performed by a base station or a component of a base station (e.g., the base station 102/180; the apparatus 1502; the baseband unit 1504, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a base station to configure a UE to request assistance with sidelink communication with at least another UE.

At 1402, the base station may transmit an AN configuration. For example, 1402 may be performed by configuration component 1540 of apparatus 1502. The base station may transmit the AN configuration to at least a first UE. The AN configuration may be for one or more ANs associated with the base station. In some aspects, the AN configuration may comprise an amount of ANs associated with the base station, location information for each of the one or more ANs, or signal directions supported by each of the one or more ANs. The signal directions supported may comprise pairs of transmission and/or reception beams that may be supported by the one or more ANs. In some aspects, the AN configuration may be transmitted via RRC signaling.

At 1404, the base station may receive an AR to request assistance with communication with a second UE. For example, 1304 may be performed by request component 1542 of apparatus 1502. The base station may receive the AR from the first UE. The base station may receive the AR to request assistance with communication with the second UE from at least one AN associated with the base station. In some aspects, the AR may comprise at least one of a desired incoming signal direction, an outgoing signal direction, or a desired AN. In some aspects, the AR may be transmitted in at least one of a MAC-CE, an SR, or a BSR. In some aspects, the AR may comprise location information for at least one of the first UE or the second UE.

At 1406, the base station may identify at least one AN that may be capable of providing assistance with the sidelink communication between the first UE and the second UE. For example, 1406 may be performed by identification component 1544 of apparatus 1502. In some aspects, the at least one AN may be capable of providing assistance based at least on position location information of the first UE or the second UE. For example, the first UE may not have line of sight or a strong connection with the second UE, but the AN may have line of sight or a strong connection with the second UE. In such instances, the AN may be capable of providing assistance in the sidelink communication between the first and second UE. In some aspects, the at least one AN may be capable of providing assistance with the sidelink transmission between the first UE and the second UE if the first UE and the second UE are in different location zones. In such instances, the different location zones may have a connection with the at least one AN that allows for the at least one AN to relay sidelink transmissions between the first and second UEs. In some aspects, at least one incoming signal direction of the at least one AN may support transmission from the first UE, and at least one outgoing signal direction of the at least one AN may support transmission to the second UE.

At 1408, the base station may activate the at least one AN. For example, 1408 may be performed by activation component 1546 of apparatus 1502. The base station may activate the at least one AN to assist in the sidelink transmission between the first UE and the second UE. In some aspects, the at least one AN may be configured, by the base station, to assist in the sidelink transmission between the first UE and the second UE in response to the AR.

At 1410, the base station may transmit a grant to schedule sidelink transmission between the first UE and the second UE. For example, 1306 may be performed by grant component 1548 of apparatus 1502. The base station may transmit the grant, to the first UE, to schedule the sidelink transmission between the first UE and the second UE. The sidelink transmission between the first UE and the second UE may be assisted by at least one AN of the one or more ANs associated with the base station. In some aspects, the grant may indicate at least one of an incoming signal direction or an outgoing signal direction of the at least one AN. In some aspects, the grant may indicate whether the at least one AN is available to assist the sidelink transmission of the first UE. In some aspects, the at least one AN may comprise at least one of a smart repeater or a RIS. In some aspects, the one or more ANs may be configured to support one or more incoming or outgoing signal direction pairs. In some aspects, the at least one AN identified as capable of providing assistance may be indicated in the grant.

Figure 15:
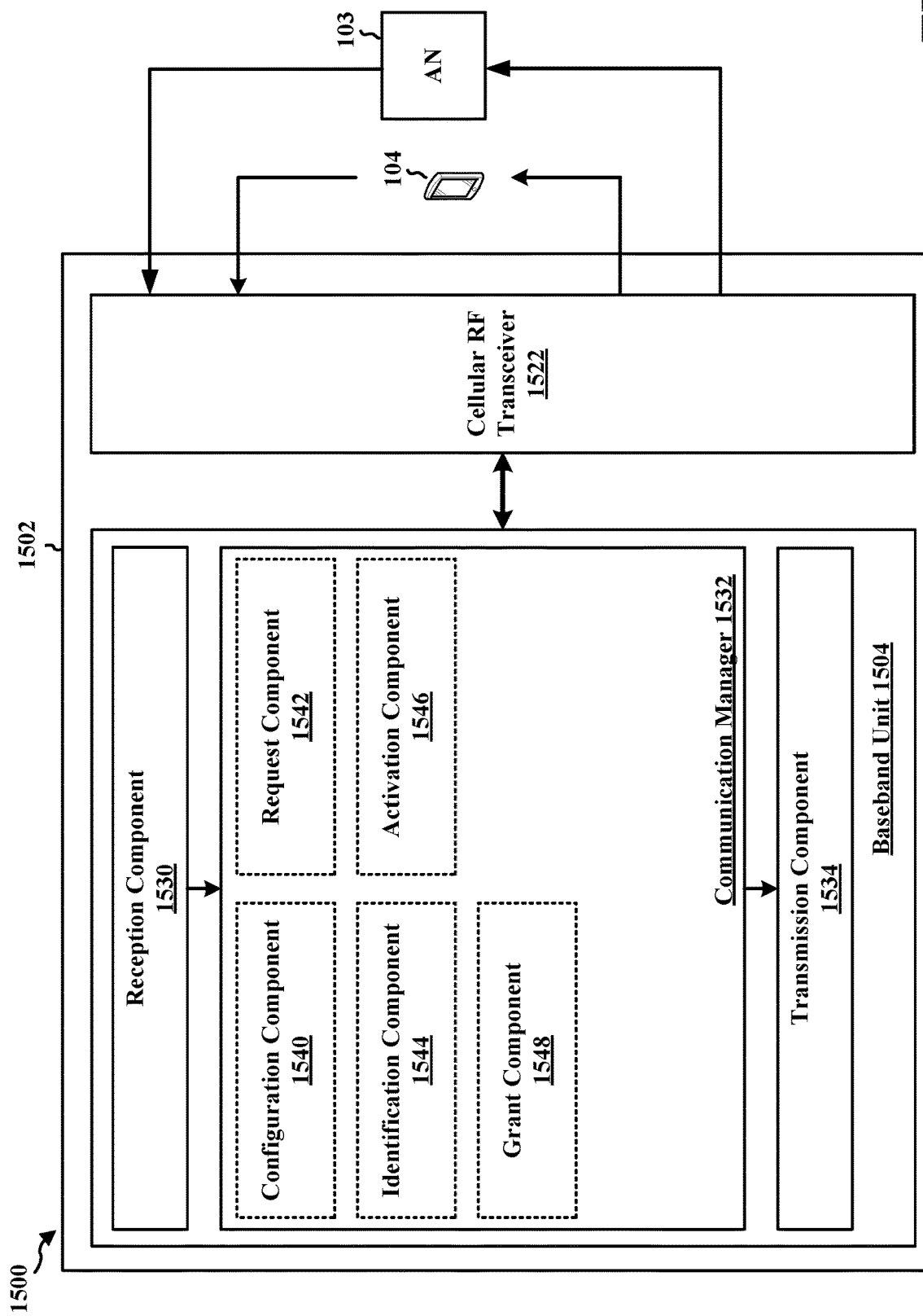
FIG. 15 is a diagram illustrating an example of a hardware implementation for an example apparatus.

FIG. 15 is a diagram 1500 illustrating an example of a hardware implementation for an apparatus 1502. The apparatus 1502 may be a base station, a component of a base station, or may implement base station functionality. In some aspects, the apparatus 1502 may include a baseband unit 1504. The baseband unit 1504 may communicate through a cellular RF transceiver 1522 with the UE 104 and/or the AN 103. The baseband unit 1504 may include a computer-readable medium/memory. The baseband unit 1504 is responsible for general processing, including the execution of software stored on the computer-readable medium/memory. The software, when executed by the baseband unit 1504, causes the baseband unit 1504 to perform the various functions described supra. The computer-readable medium/memory may also be used for storing data that is manipulated by the baseband unit 1504 when executing software. The baseband unit 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the baseband unit 1504. The baseband unit 1504 may be a component of the base station 310 and may include the memory 376 and/or at least one of the TX processor 316, the RX processor 370, and the controller/processor 375.

The communication manager 1532 includes a configuration component 1540 that may transmit an AN configuration, e.g., as described in connection with 1302 of FIG. 13 or 1402 of FIG. 14. The communication manager 1532 further includes a request component 1542 that may receive an AR to request assistance with communication with a second UE, as described in connection with 1304 of FIG. 13 or 1404 of FIG. 14. The communication manager 1532 further includes an identification component 1544 that may identify at least one AN that may be capable of providing assistance with the sidelink communication between the first UE and the second UE, e.g., as described in connection with 1406 of FIG. 14. The communication manager 1532 further includes an activation component 1546 that may activate the at least one AN, e.g., as described in connection with 1408 of FIG. 14. The communication manager 1532 further includes a grant component 1548 that may transmit a grant to schedule sidelink transmission between the first UE and the second UE, e.g., as described in connection with 1306 of FIG. 13 or 1410 of FIG. 14.

The apparatus may include additional components that perform each of the blocks of the algorithm in the flowcharts of FIG. 13 or 14. As such, each block in the flowcharts of FIG. 13 or 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the baseband unit 1504, includes means for transmitting, to at least a first UE, an AN configuration for one or more ANs associated with the base station. The apparatus includes means for receiving, from the first UE, an AR to request assistance with communication with a second UE from at least one AN associated with the base station. The apparatus includes means for transmitting, to the first UE, a grant to schedule sidelink transmission between the first UE and the second UE. The sidelink transmission between the first UE and the second UE is assisted by at least one AN of the one or more ANs associated with the base station. The apparatus further includes means for identifying at least one AN that is capable of providing assistance with the sidelink communication between the first UE and the second UE. The apparatus further includes means for activating the at least one AN to assist in the sidelink transmission between the first UE and the second UE. The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first UE including at least one processor coupled to a memory and a transceiver and configured to receive, from a base station, an AN configuration for one or more ANs associated with the base station; transmit, to the base station, an AR to request assistance with communication with a second UE from at least one AN associated with the base station; receive, from the base station, a grant to schedule sidelink transmission with the second UE, wherein the sidelink transmission with the second UE is assisted by at least one AN of the one or more ANs associated with the base station; and communicate via sidelink communication with the second UE, via the at least one AN, using allocated resources of the grant from the base station.

Aspect 2 is the apparatus of aspect 1, further includes that the AN configuration comprises an amount of ANs associated with the base station, location information for each of the one or more ANs, or signal directions supported by each of the one or more ANs.

Aspect 3 is the apparatus of any of aspects 1 and 2, further includes that the AN configuration is transmitted via RRC signaling.

Aspect 4 is the apparatus of any of aspects 1-3, further includes that the at least one processor further configured to identify at least one AN that is capable of providing assistance to communicate with the second UE, wherein the at least one AN identified as capable of providing assistance is indicated in the AR.

Aspect 5 is the apparatus of any of aspects 1-4, further includes that the at least one AN is capable of providing assistance based at least on position location information of the first UE or the second UE.

Aspect 6 is the apparatus of any of aspects 1-5, further includes that the at least one AN is capable of providing assistance with the sidelink transmission between the first UE and the second UE if the first UE and the second UE are in different location zones.

Aspect 7 is the apparatus of any of aspects 1-6, further includes that at least one incoming signal direction of the at least one AN supports transmission from the first UE, and at least one outgoing signal direction of the at least one AN supports transmission to the second UE.

Aspect 8 is the apparatus of any of aspects 1-7, further includes that the AR comprises at least one of a desired incoming signal direction, an outgoing signal direction, or a desired AN.

Aspect 9 is the apparatus of any of aspects 1-8, further includes that the AR is transmitted in at least one of a MAC-CE, an SR, or a BSR.

Aspect 10 is the apparatus of any of aspects 1-9, further includes that the AR comprises location information for at least one of the first UE or the second UE.

Aspect 11 is the apparatus of any of aspects 1-10, further includes that the grant indicates at least one of an incoming signal direction or an outgoing signal direction of the at least one AN, or whether the at least one AN is available to assist the sidelink transmission of the first UE.

Aspect 12 is the apparatus of any of aspects 1-11, further includes that the at least one AN comprises at least one of a smart repeater or an RIS.

Aspect 13 is the apparatus of any of aspects 1-12, further includes that the one or more ANs are configured to support one or more incoming or outgoing signal direction pairs.

Aspect 14 is a method of wireless communication for implementing any of aspects 1-13.

Aspect 15 is an apparatus for wireless communication including means for implementing any of aspects 1-13.

Aspect 16 is a computer-readable medium storing computer executable code, where the code when executed by a processor causes the processor to implement any of aspects 1-13.

Aspect 17 is an apparatus for wireless communication at a base station including at least one processor coupled to a memory and a transceiver and configured to transmit, to at least a first UE, an AN configuration for one or more ANs associated with the base station; receive, from the first UE, an AR to request assistance with communication with a second UE from at least one AN associated with the base station; and transmit, to the first UE, a grant to schedule sidelink transmission between the first UE and the second UE, wherein the sidelink transmission between the first UE and the second UE is assisted by at least one AN of the one or more ANs associated with the base station.

Aspect 18 is the apparatus of aspect 17, further includes that the AN configuration comprises an amount of ANs associated with the base station, location information for each of the one or more ANs, or signal directions supported by each of the one or more ANs.

Aspect 19 is the apparatus of any of aspects 17 and 18, further includes that the AN configuration is transmitted via RRC signaling.

Aspect 20 is the apparatus of any of aspects 17-19, further includes that the at least one processor further configured to identify at least one AN that is capable of providing assistance with the sidelink communication between the first UE and the second UE, wherein the at least one AN identified as capable of providing assistance is indicated in the grant.

Aspect 21 is the apparatus of any of aspects 17-20, further includes that the at least one AN is capable of providing assistance based at least on position location information of the first UE or the second UE.

Aspect 22 is the apparatus of any of aspects 17-21, further includes that the at least one AN is capable of providing assistance with the sidelink transmission between the first UE and the second UE if the first UE and the second UE are in different location zones.

Aspect 23 is the apparatus of any of aspects 17-22, further includes that at least one incoming signal direction of the at least one AN supports transmission from the first UE, and at least one outgoing signal direction of the at least one AN supports transmission to the second UE.

Aspect 24 is the apparatus of any of aspects 17-23, further includes that the at least one processor further configured to activate the at least one AN to assist in the sidelink transmission between the first UE and the second UE.

Aspect 25 is the apparatus of any of aspects 17-24, further includes that the at least one AN is configured, by the base station, to assist in the sidelink transmission between the first UE and the second UE in response to the AR.

Aspect 26 is the apparatus of any of aspects 17-25, further includes that the AR comprises at least one of a desired incoming signal direction, an outgoing signal direction, or a desired AN.

Aspect 27 is the apparatus of any of aspects 17-26, further includes that the AR is received in at least one of a MAC-CE, an SR, or a BSR.

Aspect 28 is the apparatus of any of aspects 17-27, further includes that the AR comprises location information for at least one of the first UE or the second UE.

Aspect 29 is the apparatus of any of aspects 17-28, further includes that the grant indicates at least one of an incoming signal direction or an outgoing signal direction of the at least one AN, or whether the at least one AN is available to assist the sidelink transmission of the first UE.

Aspect 30 is the apparatus of any of aspects 17-29, further includes that the at least one AN comprises at least one of a smart repeater or a RIS.

Aspect 31 is the apparatus of any of aspects 17-30, further includes that the one or more ANs are configured to support one or more incoming or outgoing signal direction pairs.

Aspect 32 is a method of wireless communication for implementing any of aspects 17-31.

Aspect 33 is an apparatus for wireless communication including means for implementing any of aspects 17-31.

Aspect 34 is a computer-readable medium storing computer executable code, where the code when executed by a processor causes the processor to implement any of aspects 17-31.

What is claimed is:

1. An apparatus for wireless communication at a first user equipment (UE), comprising:
    memory;
    a transceiver; and
    at least one processor coupled to the memory and the transceiver, the at least one processor configured to:
        receive, from a base station, an assisting node (AN) configuration for one or more ANs associated with the base station, wherein the AN configuration comprises at least location information for each of the one or more ANs and a set of signal directions supported by each of the one or more ANs;
        transmit, to the base station, an assistance request (AR) to request assistance with communication with a second UE from at least one AN associated with the base station, wherein the AR comprises at least one of a desired incoming signal direction or a desired outgoing signal direction;
        receive, from the base station, a grant to schedule sidelink transmission with the second UE, wherein the sidelink transmission with the second UE is assisted by at least one AN of the one or more ANs associated with the base station; and
        communicate via sidelink communication with the second UE, via the at least one AN, using allocated resources of the grant from the base station.

2. The apparatus of claim 1, wherein to receive the AN configuration, the at least one processor is configured to receive the AN configuration via radio resource control (RRC) signaling.

3. The apparatus of claim 1, wherein the at least one processor further configured to:
    identify at least one AN that is capable of providing assistance to communicate with the second UE, wherein the at least one AN identified as capable of providing assistance is indicated in the AR.

4. The apparatus of claim 3, wherein the at least one AN is capable of providing assistance based at least on position location information of the first UE or the second UE.

5. The apparatus of claim 4, wherein the at least one AN is capable of providing assistance with the sidelink transmission between the first UE and the second UE if the first UE and the second UE are in different location zones.

6. The apparatus of claim 3, wherein at least one incoming signal direction of the at least one AN supports transmission from the first UE, and at least one outgoing signal direction of the at least one AN supports transmission to the second UE.

7. The apparatus of claim 1, wherein the AR comprises a desired AN.

8. The apparatus of claim 1, wherein to transmit the AR, the at least one processor is configured to transmit the AR in at least one of a medium access control (MAC) control element (MAC-CE), a scheduling request (SR), or a buffer status report (BSR).

9. The apparatus of claim 1, wherein the AR comprises location information for at least one of the first UE or the second UE.

10. The apparatus of claim 1, wherein the grant indicates at least one of an incoming signal direction or an outgoing signal direction of the at least one AN, or whether the at least one AN is available to assist the sidelink transmission of the first UE.

11. The apparatus of claim 1, wherein the at least one AN comprises at least one of a smart repeater or a reconfigurable intelligent surface (RIS).

12. The apparatus of claim 1, wherein the one or more ANs are configured to support one or more incoming or outgoing signal direction pairs.

13. A method of wireless communication at a first user equipment (UE), comprising:
    receiving, from a base station, an assisting node (AN) configuration for one or more ANs associated with the base station, wherein the AN configuration comprises at least location information for each of the one or more ANs and a set of signal directions supported by each of the one or more ANs;
transmitting, to the base station, an assistance request (AR) to request assistance with communication with a second UE from at least one AN associated with the base station, wherein the AR comprises at least one of a desired incoming signal direction or a desired outgoing signal direction;
receiving, from the base station, a grant to schedule sidelink transmission with the second UE, wherein the sidelink transmission with the second UE is assisted by at least one AN of the one or more ANs associated with the base station; and
communicating via sidelink communication with the second UE, via the at least one AN, using allocated resources of the grant from the base station.

14. An apparatus for wireless communication at a base station, comprising:
memory;
a transceiver; and
at least one processor coupled to the memory and the transceiver, the at least one processor configured to:
transmit, to at least a first user equipment (UE), an assisting node (AN) configuration for one or more ANs associated with the base station, wherein the AN configuration comprises at least location information for each of the one or more ANs and a set of signal directions supported by each of the one or more ANs;
receive, from the first UE, an assistance request (AR) to request assistance with communication with a second UE from at least one AN associated with the base station, wherein the AR comprises at least one of a desired incoming signal direction or a desired outgoing signal direction; and
transmit, to the first UE, a grant to schedule sidelink transmission between the first UE and the second UE, wherein the sidelink transmission between the first UE and the second UE is assisted by at least one AN of the one or more ANs associated with the base station.

15. The apparatus of claim 14, wherein to transmit the AN configuration, the at least one processor is configured to transmit the AN configuration via radio resource control (RRC) signaling.

16. The apparatus of claim 14, wherein the at least one processor further configured to:
identify at least one AN that is capable of providing assistance with the sidelink communication between the first UE and the second UE, wherein the at least one AN identified as capable of providing assistance is indicated in the grant.

17. The apparatus of claim 16, wherein the at least one AN is capable of providing assistance based at least on position location information of the first UE or the second UE.

18. The apparatus of claim 17, wherein the at least one AN is capable of providing assistance with the sidelink transmission between the first UE and the second UE if the first UE and the second UE are in different location zones.

19. The apparatus of claim 16, wherein at least one incoming signal direction of the at least one AN supports transmission from the first UE, and at least one outgoing signal direction of the at least one AN supports transmission to the second UE.

20. The apparatus of claim 14, wherein the at least one processor further configured to:
activate the at least one AN to assist in the sidelink transmission between the first UE and the second UE.

21. The apparatus of claim 20, wherein the at least one AN is configured, by the base station, to assist in the sidelink transmission between the first UE and the second UE in response to the AR.

22. The apparatus of claim 14, wherein the AR comprises a desired AN.

23. The apparatus of claim 14, wherein to receive the AR, the at least one processor is configured to receive the AR in at least one of a medium access control (MAC) control element (MAC-CE), a scheduling request (SR), or a buffer status report (BSR).

24. The apparatus of claim 14, wherein the AR comprises location information for at least one of the first UE or the second UE.

25. The apparatus of claim 14, wherein the grant indicates at least one of an incoming signal direction or an outgoing signal direction of the at least one AN, or whether the at least one AN is available to assist the sidelink transmission of the first UE.

26. The apparatus of claim 14, wherein the at least one AN comprises at least one of a smart repeater or a reconfigurable intelligent surface (RIS).

27. The apparatus of claim 14, wherein the one or more ANs are configured to support one or more incoming or outgoing signal direction pairs.

28. A method of wireless communication at a base station, comprising:
transmitting, to at least a first user equipment (UE), an assisting node (AN) configuration for one or more ANs associated with the base station, wherein the AN configuration comprises at least location information for each of the one or more ANs and a set of signal directions supported by each of the one or more ANs;
receiving, from the first UE, an assistance request (AR) to request assistance with communication with a second UE from at least one AN associated with the base station, wherein the AR comprises at least one of a desired incoming signal direction or a desired outgoing signal direction; and
transmitting, to the first UE, a grant to schedule sidelink transmission between the first UE and the second UE, wherein the sidelink transmission between the first UE and the second UE is assisted by at least one AN of the one or more ANs associated with the base station.

* * * * *